United States Patent
George et al.

(10) Patent No.: US 11,113,721 B2
(45) Date of Patent: Sep. 7, 2021

(54) DYNAMIC SENTIMENT-BASED MAPPING OF USER JOURNEYS

(71) Applicant: Adobe Inc., San Jose, CA (US)

(72) Inventors: William Brandon George, Pleasant Grove, UT (US); Jordan Walker, Lehi, UT (US); Benjamin R. Gaines, Highland, UT (US)

(73) Assignee: ADOBE INC., San Jose, CA (US)

( * ) Notice: Subject to any disclaimer, the term of this patent is extended or adjusted under 35 U.S.C. 154(b) by 299 days.

(21) Appl. No.: 15/659,511

(22) Filed: Jul. 25, 2017

(65) Prior Publication Data

US 2019/0034963 A1     Jan. 31, 2019

(51) Int. Cl.
```
G06Q 30/06      (2012.01)
G06Q 30/02      (2012.01)
G06Q 30/00      (2012.01)
G06N 5/04       (2006.01)
H04L 29/08      (2006.01)
```
(52) U.S. Cl.
CPC .......... *G06Q 30/0246* (2013.01); *G06N 5/04* (2013.01); *G06Q 30/016* (2013.01); *G06Q 30/0253* (2013.01); *H04L 67/22* (2013.01)

(58) Field of Classification Search
CPC .................................................. G06Q 30/00
USPC ........................................................ 705/14
See application file for complete search history.

(56) References Cited

U.S. PATENT DOCUMENTS

| | | | |
|---|---|---|---|
| 5,751,942 A * | 5/1998 | Christensen | G06F 11/3636 714/34 |
| 9,336,268 B1 * | 5/2016 | Moudy | G06F 16/244 |
| 9,787,705 B1 * | 10/2017 | Love | G06F 16/9024 |
| 2002/0004774 A1 * | 1/2002 | Defarlo | G06Q 40/06 705/36 R |
| 2003/0143990 A1 * | 7/2003 | Minear | H04M 1/72525 455/418 |

(Continued)

OTHER PUBLICATIONS

Mobile Ethnography (Stickdorn, Marc and Schneider, Jakob (Oct. 5, 2015, Published). Mobile Ethnography ExperienceFellow a service design start-upRetrieved from https://www.slideshare.net/jakoblies/marc-stickdorn-jakob-schneider-mobile-ethnography-and-experiencefellow-a-service-design-startup?qid=1be97d5e-afba-4.*

(Continued)

*Primary Examiner* — Eric R Netzloff
(74) *Attorney, Agent, or Firm* — Keller Jolley Preece

(57) ABSTRACT

The present disclosure covers systems and methods for collecting and analyzing analytics data for a plurality of online user interactions and aggregating the analytics data to determine sentiment scores and generate a presentation of a path of interactions. For example, the systems and methods analyze the analytics data to identify attributes of the online user interactions and determine, based on the identified attributes, a sentiment score for each of the plurality of online user interactions. In addition, the systems and methods aggregate the plurality of online user online user interactions to identify an interaction path commonly experienced by the users of the interactions. Further, the systems and methods generate and provide an interactive presentation including a visualization of the interaction path and associated ranges of sentiment scores associated with types of online user interactions that make up the interaction path.

20 Claims, 10 Drawing Sheets

(56) References Cited

U.S. PATENT DOCUMENTS

| | | | |
|---|---|---|---|
| 2010/0169159 A1* | 7/2010 | Rose | G06Q 30/0278 |
| | | | 705/7.29 |
| 2013/0124257 A1* | 5/2013 | Schubert | G06Q 30/02 |
| | | | 705/7.29 |
| 2013/0138749 A1* | 5/2013 | Bohm | H04L 51/32 |
| | | | 709/206 |
| 2014/0013223 A1* | 1/2014 | Aamir | G06F 40/30 |
| | | | 715/273 |
| 2014/0372226 A1* | 12/2014 | Pavley | G06Q 30/0269 |
| | | | 705/14.66 |
| 2015/0066814 A1* | 3/2015 | Allen | G06F 40/30 |
| | | | 706/11 |
| 2015/0242494 A1* | 8/2015 | Safaie | G06F 16/9535 |
| | | | 707/749 |
| 2015/0262107 A1* | 9/2015 | Singh | G06Q 10/06393 |
| | | | 705/7.39 |
| 2016/0217488 A1* | 7/2016 | Ward | G06F 16/313 |
| 2017/0039233 A1* | 2/2017 | Gauthier | G06F 16/26 |
| 2017/0039491 A1* | 2/2017 | Gauthier | G06Q 10/067 |
| 2018/0025359 A1* | 1/2018 | Marum | G06Q 10/067 |
| | | | 705/7.27 |
| 2018/0081500 A1* | 3/2018 | Erant | G06Q 10/10 |
| 2018/0137425 A1* | 5/2018 | D'Alo' | G06N 5/04 |

OTHER PUBLICATIONS

ExperienceFellow—The researchers perspective (Stickdorn, Marc (Apr. 26, 2017, Published). ExperienceFellow—The researchers perspective. Retrieved from https://www.youtube.com/watch?v=8LfsiBZId4U. (Year: 2017).*

Lankhorst, Mark. "ArchiMate 3.3 and Customer Journey Maps." BiZZdesign Blog (Sep. 18, 2016) Retrieved on Nov. 15, 2019 from https://bizzdesign.com/blog/archimate-3-0-and-customer-journey-maps/ (Year: 2016).*

Galetto, Moly. "Top Customer Journey Mapping Tools: 50 Useful Software Tools to Map and Visualize Your Customer Journey and Improve the Customer Experience." NG Data (May 18, 2017). Retrieved on Jun. 25, 2020 from https://www.ngdata.com/best-customer-journey-mapping-tools/ (Year: 2017).*

Kan Nishida, Jul. 11, 2016 (Introduction to Text Sentiment Analysis in Exploratory), blog.exploratory.io, accessed Wayback Machine on Sep. 3, 2016. (https://blog.exploratory.io/twitter-sentiment-analysis-scoring-by-sentence-b4d455de3560). (Year: 2016).*

* cited by examiner

DYNAMIC SENTIMENT-BASED MAPPING OF USER JOURNEYS

BACKGROUND

Customers often communicate with companies, product providers, or other entities several times over a period leading up to purchase of a product. For example, customers and potential customers can reach out to companies and/or product providers by calling over the phone, visiting a website, or visiting a location in-person. In addition, companies and providers can reach out to customers and potential customers via advertisements, phone calls, emails, and other forms of communication. Indeed, customers and potential customers can follow a customer journey including a number of instances of communication with a respective company prior to making a purchase, receiving a product, or otherwise engaging with the company in a meaningful way.

Marketers, companies, and product providers often desire to understand the journey that customers follow leading up to a purchase (e.g., the customer journey). For example, companies often desire to understand at what point customers go through cycles of awareness, consideration, intent, and purchase. Nevertheless, as the number of observable interactions between customers and businesses increase, and as more and more of the interactions occur over the Internet (e.g., via Internet browsers, web applications, mobile apps, etc.), conventional systems often fail to effectively analyze and understand the customer journey across the ever-increasing variety of channels of communication. As a result, interested parties often fail to identify communications between customers and businesses that positively or negatively contribute toward the customer journey.

Despite the utility of identifying communications and interactions between customers and businesses, the amount of analytic data a system may collect for even a single website or application may be unwieldy or too difficult to manage or mine. The amount of data can be particularly problematic for websites or applications that receive thousands, millions, or even billions of daily visitors or users. Conventional analytics engines often lack the ability to identify and organize captured data in meaningful ways. Even conventional analytics engines that possess this ability, however, consume significant processing power to create meaningful analyses. To identify meaningful interactions for some high-volume websites or applications, some conventional analytics engines or methods may require individually analyzing billions of transactions. Without the processing power or time to individually analyze such a large quantity of transactions, some web administrators must manually program code to generate the segment. Such customized segmenting is often time consuming and does not allow the administrator to easily change or revise the segment.

Furthermore, even where companies, marketers, and product providers analyze customer data to determine results associated with the customer journey, conventional systems often fail to provide useful reports of the analytical results. For example, while conventional systems can provide an illustration of collected data, conventional systems often fail to provide an illustration of the data in such a way that a layperson viewing the results can understand which interactions between a customer and company are significant. In addition, conventional systems do not provide an interactive presentation of a customer journey that provides a positive user experience in viewing and understanding interactions that make up a customer journey.

SUMMARY

Embodiments of the present disclosure provide benefits and/or solve one or more of the foregoing problems in the art with systems and methods that determine user sentiment with respect to user interactions and provide visualizations of the determined user sentiment across a user journey. More specifically, the systems and methods described herein collect analytics data on a per-user basis for a plurality of online user interactions with respect to an online entity. The systems and methods further analyze the analytics data to identify various attributes associated with the online user interactions. Based on the identified attributes for the respective online user interactions, the systems and methods determine sentiment scores that indicate a measurement of sentiment of a user with respect to the online user interactions. In addition to determining sentiment scores for the online user interactions, the systems and methods described herein further aggregate online user interactions to identify an interaction path that users frequently have in common. For example, the systems and methods determine an interaction path including types of online user interactions representative of a journey frequently experienced by the users associated with the online user interactions. Upon determining the interaction path, the systems and methods further generate an interactive visualization of the interaction path that includes icons for respective types of online user interactions as well as associated visualizations of the sentiment scores.

Additional features and advantages of one or more embodiments of the present disclosure will be set forth in the description which follows, and in part will be obvious from the description, or may be learned by the practice of such example embodiments.

BRIEF DESCRIPTION OF THE DRAWINGS

Various embodiments will be described and explained with additional specificity and detail through the use of the accompanying drawings in which.

DETAILED DESCRIPTION

Figure 1:
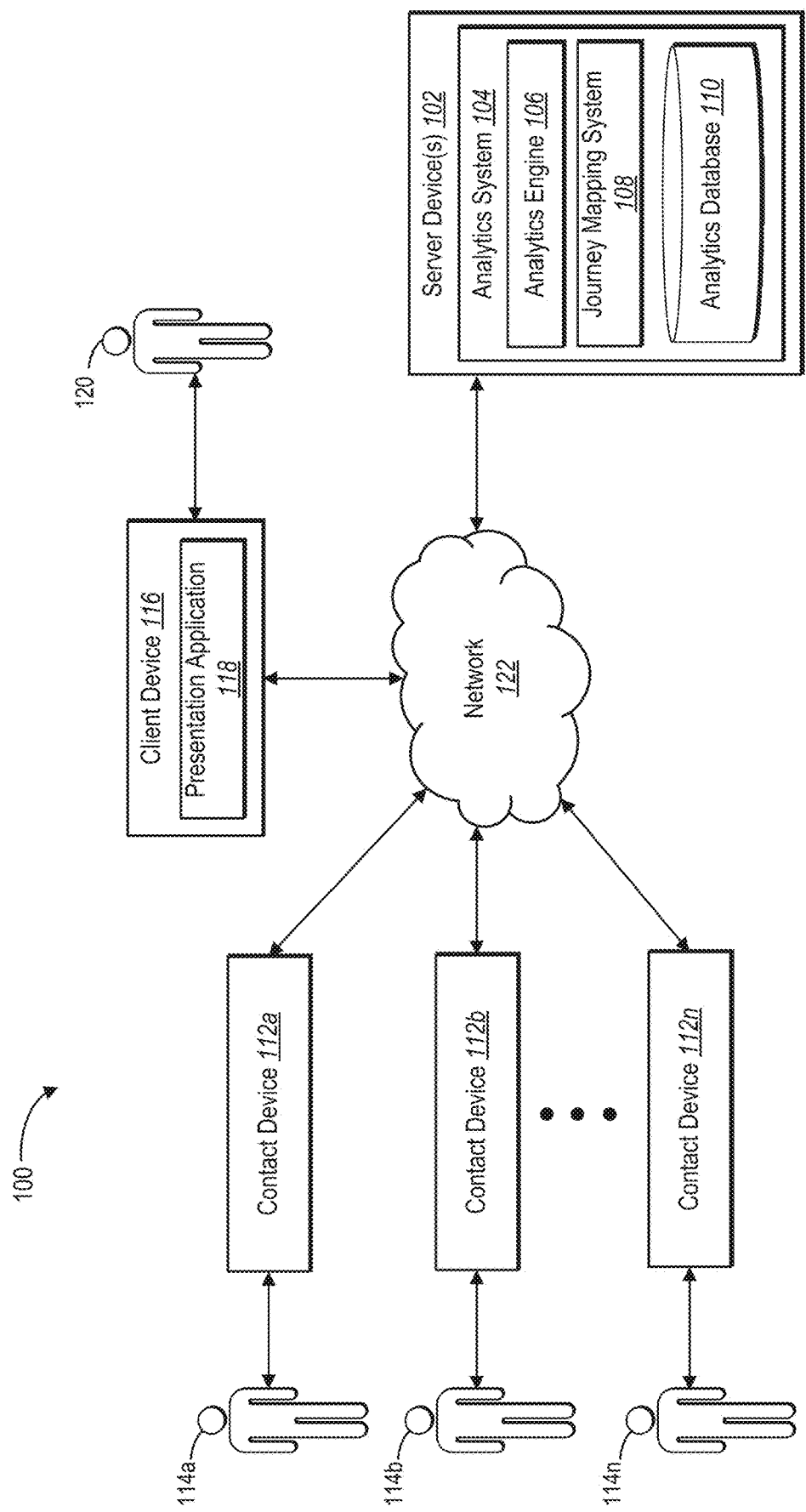
FIG. 1 illustrates a block diagram of an environment in which a journey mapping system operates in accordance with one or more embodiments.

One or more embodiments of the present disclosure include a journey mapping system that aggregates analytics data of online user interactions (or simply "interactions") for a plurality of users to determine a user journey that includes a path of interactions that frequently leads to a target metric (e.g., a purchase or other success criterion) for the plurality of users. In addition, the journey mapping system identifies and analyzes attributes (e.g., behavioral and descriptive data signals) of the interactions to determine a sentiment score for different types of interactions that make up the path of interactions. Furthermore, the journey mapping system generates an interactive presentation of the interaction path including icons for the different types of interactions as well as a visualization of the sentiment scores for the respective types of interactions that make up the interaction path.

As an overview, the journey mapping system collects analytics data with regard to interactions (e.g., touchpoints) between users and an online entity (e.g., a business, marketer, product provider). In particular, the journey mapping system collects analytics data on a per-user basis including information associated with respective interactions across different communication channels (e.g., web interface, mobile application). The journey mapping system collects information about a number of interactions including user information, time information, and interaction-type, as well as other information associated with individual interactions.

Based on the analytics information, the journey mapping system identifies attributes of respective interactions indicative of a positive or negative sentiment of a user with respect to the associated interactions. For example, in one or more embodiments, the journey mapping system identifies, from the analytics information for a given interaction, behavioral or descriptive information for the given interaction, and calculates or otherwise determines a sentiment score for the user indicative of a positive or negative sentiment with respect to the given interaction. As will be described in additional detail below, the journey mapping system identifies attributes for different types of interactions and determines the sentiment score based on a combination of the identified attributes. In addition, as will be described in further detail below, the journey mapping system determines the sentiment score for different interactions based on a combination of different attributes for different types of interactions.

In addition to determining sentiment scores for interactions, the journey mapping system aggregates the interaction data (e.g., analytics data) to determine a path of interactions that users commonly experience along the way to fulfilling a desired metric. For example, the journey mapping system identifies trends of interactions (e.g., common sequences of interactions) that lead to an eventual purchase, subscription, or other desired interaction. Alternatively, the journey mapping system identifies trends of interactions that lead to an undesired metric (e.g., an un-subscription, order cancellation).

Moreover, in one or more embodiments, the journey mapping system generates an interactive presentation including a visualization of an interaction path and the determined sentiment scores for respective types of interactions along the interaction path. For example, in one or more embodiments, the journey mapping system provides, via a graphical user interface of a client device, a presentation including a path of interactions showing a sequence of interactions that commonly lead to an eventual purchase of a product (or another target metric). In addition, where the journey mapping system has determined a sentiment score for each of the interaction-types that make up the interaction path, the journey mapping system further generates a visualization of the range of sentiment scores for the corresponding types of interactions based on the determined sentiment scores for individual interactions.

As will be described in further detail below (e.g., in connection with FIGS. 3A-3E), the journey mapping system generates a visualization of the interaction path and associated ranges of sentiment scores in a variety of ways. For instance, in one or more embodiments, the journey mapping system provides additional information within the presentation including digital assets (e.g., an image, video), raw data, trends of attributes, data outliers, contributing factors, and other information about the interactions of the interaction path. The journey mapping system can further provide information about specific communication channels associated with respective interactions. Moreover, in one or more embodiments, the journey mapping system enables filtering of the presentation based on segments of users, frequency of different types of interactions, and other criteria to further refine the presentation of the interaction path.

Thus, the journey mapping system facilitates collection and analysis of analytics data associated with a massive number of interactions between an ever-increasing user base and an online entity. In particular, the journey mapping system facilitates collection of analytical data for online interactions from a number of different communication channels (e.g., website, mobile app) and including communication to and from users with respect to the online entity. The journey mapping system overcomes shortcomings of conventional systems that experience difficulty tracking and analyzing analytical data for online interactions that take place across different communication channels (e.g., Internet-based communication channels) by generating visualizations that distill the massive amounts of data to pertinent and actionable data. Indeed, in addition to generally tracking interaction data across different channels, the journey mapping system determines an interaction path including interactions across the different channels and associated sentiment scores for the different types of interactions that make up the interaction path.

As noted, the journey mapping system provides a visualization of the interaction path and sentiment scores in an easy to understand and interactive presentation that enables a user to easily understand and modify the presentation in a variety of ways. For example, as will be described in further detail below, the journey mapping system provides an interactive presentation including interaction features that enable a user to view additional information with respect to individual interactions, filter the visualization of the interaction path, and better understand aspects of the interaction path and determined sentiment scores. In this way, a business, marketer, or other entity can understand and conceptualize interactions along a customer journey that are successful and where customers are becoming dissatisfied (and why).

Moreover, in one or more embodiments, the journey mapping system reduces a processing load on a server device(s) and/or client device(s) by selectively identifying, analyzing, and/or visualizing relevant interactions for an interaction path leading to a target metric. For example, in one or more embodiments, the journey mapping system receives a user input or other indication of a target metric (e.g., purchasing a product). In response, the journey mapping system identifies interactions by users (e.g., relevant users) associated with the target metric while discarding or otherwise ignoring interactions by users not associated with the target metric. Accordingly, rather than identifying each and every interaction by all users of a user base, the journey mapping system selectively identifies those interactions associated with relevant users determined to be associated with the target metric and provides a visualization of relevant interactions associated with those users.

In addition to selectively identifying and visualizing interactions of relevant users, the journey mapping system can additionally selectively identify those interactions having a threshold correlation with the target metric. For example, because users can perform any number and variety of interactions leading up to a target metric, the journey mapping system can further reduce the number of identifying, analyzed, and/or visualized interactions by identifying those interactions experienced by a minimum number of users leading up to a target metric.

By selectively identifying, analyzing, and/or visualizing interactions associated with relevant users and/or associated with a target metric, the journey mapping system reduces a processing load involved with mapping and visualizing user journeys. In this way, the journey mapping system facilitates efficient analysis and mapping of a massive number of interactions from thousands, millions, or even billions of users. In addition, selectively identifying, analyzing, and visualizing the interactions improves an experience for administrators by providing an easily understood and customizable visualization of an interaction path associated with a target metric.

As used herein, an "interaction" (e.g., a user interaction) refers to a point of contact between a user and entity (e.g., online entity). For example, in one or more embodiments, an interaction refers to a communication between an online entity and a user or one or more tracked actions of a user with respect to content provided by or otherwise associated with the online entity. In one or more embodiments, an interaction refers to a touchpoint or contact associated with a target metric (e.g., a purchase, download, subscription). One or more embodiments described herein relate specifically to online user interactions between a user and an online entity. Nevertheless, features and functionality described herein with regard to collecting and analyzing data and information associated with online user interactions can similarly apply to other types of interactions between a user and entity. As further used herein, an "interaction-type" or "type of interaction" refers to a defined interaction of a particular type (e.g., delivering a video, registering an account, etc.).

As used herein, an "attribute" refers to identified data or information associated with an interaction that may be used to determine an overall feeling of satisfaction or a metric of sentiment for a user involved with the interaction. For example, an attribute may refer to a feature or characteristic about an interaction indicative of a positive or negative experience of a user with respect to the interaction. In one or more embodiments, an attribute refers to a predefined signal or other feature determined based on analytics data (e.g., timestamp data, user data, device data) collected for the interaction. In addition, in one or more embodiments, an attribute refers to text, survey results, identified key words or phrases, detected user inputs, or other descriptive or behavioral signal (e.g., based on various types of analytical data) associated with a given interaction that may be used to determine a sentiment of the user involved with the interaction.

As used herein the term "sentiment" refers to a view, attitude, or opinion regarding a topic. Sentiments can be positive, negative, or neutral. Furthermore, sentiments can have varying levels of positivity or neutrality. For example, a sentiment can be positive if it casts a product or interaction in a positive light. Additionally, a sentiment can be positive if it casts a competitor's product in a negative light. Along related lines, a sentiment can be negative if it casts a product or experience in a negative light or casts a competitor's product in a positive light.

As used herein, a "sentiment score" refers to a measurement of sentiment of a user with regard to an interaction. In particular, a sentiment score refers to a measurement of sentiment based on one or a combination of identified attributes for a corresponding interaction. A sentiment score includes a range of scores indicative of a level of satisfaction of a user associated with an interaction. In one or more embodiments, a sentiment score refers to a measurement of sentiment for an individual interaction. In addition, as used herein, a "range of sentiment scores" refers to a range of sentiment scores for different interactions of the same interaction-type (e.g., interactions having the same interaction identifier).

As used herein, a "path of interactions" refers to a path including a plurality of types of interactions frequently experienced by users prior to fulfilling or arriving at a target metric. For example, a path of interactions includes a sequence of a number of interaction-types experienced by a threshold number or percentage of users prior to purchasing a product, renewing a subscription, or otherwise fulfilling a target metric.

As used herein, a "target metric" refers to an action by a user associated with a particular result. For example, in one or more embodiments, a target metric refers to a desired interaction such as purchasing a product, registering a user-account, or renewing a subscription. Alternatively, in one or more embodiments, a target metric refers to an undesired interaction such as canceling a subscription, returning an item, or providing a negative review for a product. As such, an interaction path toward a target metric can refer to a plurality (e.g., a sequence) of interactions commonly experienced by users prior to performing, arriving at, or otherwise fulfilling the target metric.

Additional detail will now be described by way of example in connection to the FIGS. For example, FIG. 1 illustrates an example environment including an analytics system in which the journey mapping system operates. For example, FIG. 1 is a block diagram illustrating an environment 100 including a server device(s) 102 having an analytics system 104 thereon. As shown in FIG. 1, the analytics system 104 includes an analytics engine 106, journey mapping system 108, and an analytics database 110. As further shown, the environment 100 includes contact devices 112a-n associated with respective users 114a-n involved with interactions between the users 114a-n and an online entity. The environment 100 further includes a client device 116 including a presentation application 118 thereon and associated with a user 120 of the client device 116.

As shown in FIG. 1, the server device(s) 102, contact devices 112a-n, and client device 116 can communicate over a network 122, which may include one or multiple networks and may use one or more communication platforms or technologies suitable for transmitting data. In one or more embodiments, the network 122 includes the Internet or World Wide Web. In addition, or as an alternative, the network 122 can include various other types of networks that use various communication technologies and protocols, as described in additional detail below.

Although FIG. 1 illustrates a particular number and arrangement of contact devices 112a-n and client device 116, it will be understood that the environment 100 can include a number of contact devices 112a-n and client device(s) 116. In addition, the contact devices 112a-n and client device 116 can refer to various types of computing devices. For example, one or more of the devices 112a-n, 116 may include a mobile device such as a mobile telephone, a smartphone, a PDA, a tablet, or a laptop. Additionally, or alternatively, one or more of the devices 112a-n, 116 may include a non-mobile device such as a desktop computer, a server, or another type of computing device.

As mentioned above, and as shown in FIG. 1, the client device 116 includes a presentation application 118 shown thereon. In one or more embodiments, the presentation application 118 refers to a software application associated with the analytics system 104 that facilitates providing, via the client device 116, a presentation of a path of interactions and associated sentiment scores in accordance with one or more embodiments described herein. In one or more embodiments, the presentation application 118 is a native application on the client device 116. Alternatively, in one or more embodiments, the presentation application 118 refers to a web browser used to access the journey mapping system 108 (e.g., a website associated with the analytics system 104 provided via a web browser on the client device 116).

As an overview, the analytics system 104 collects analytics data from the contact devices 112a-n including information associated with interactions between users 114a-n and an online entity. For example, in one or more embodiments, the server device(s) 102 and/or third-party server tracks user activity data and reports the tracked user activity data to the analytics engine 106. In one or more embodiments, the analytics engine 106 receives user activity data based on activities performed by users 114a-n using contact devices 112a-n.

As an example, a first user 114a may experience a first interaction by receiving a video advertisement for display on the first contact device 112a (e.g., a mobile device or other computing device). Using one of a variety of tracking methods, the analytics engine 106 detects the first interaction and collects information about the first interaction including, for example, an identifier of the video advertisement, an identity of the first user 114a to whom the video advertisement was delivered, a timestamp associated with when the video advertisement was delivered, an identifier of a device (e.g., first contact device 112a or other contact device associated with the first user 114a). The analytics engine 106 optionally further collects additional information about the interaction including an amount of time that the first user 114a viewed the advertisement, whether the first user 114a interacted with the advertisement (e.g., selected a link), or whether the first user 114a viewed the video advertisement multiple times.

Soon after experiencing the first interaction, the first user 114a may experience or otherwise engage in a second interaction that involves visiting a website associated with a product or online entity that delivered the video advertisement. Similar to collecting analytics data with regard to the first interaction, the analytics engine 106 similarly detects the second interaction and collects information about the second interaction. The analytics engine 106 additionally detects and collects information about subsequent interactions (e.g., registering an account, subscribing to receive emails, asking a question, taking a survey, etc.) and stores the interaction information on the analytics database.

Thus, the analytics engine 106 detects interactions and collects data (e.g., analytics data) including information about interactions between the first user 114a and the online entity. The analytics engine 106 similarly collects information about interactions between the other users 114b-n and the online entity using a variety of tracking methods. In addition, while FIG. 1 shows an arrangement of contact devices 112a-n and respective users 114a-n, it will be understood that the environment 100 can include multiple devices for one or more of respective users 114a-n. For example, a first user may interact with an online entity at different times using several different devices. A first interaction of a first user 114a may involve receiving content (e.g., a video advertisement) via a website on a laptop computer while additional interactions may involve placing an order over the phone, visiting the website using a desktop computer, and/or logging into an account via a mobile application on a mobile device.

Upon collecting the analytics data including information about the online user interactions, the analytics system 104 can further analyze the analytics data to identify attributes of the associated interactions. In particular, in one or more embodiments, the journey mapping system 108 identifies data (e.g., behavioral and descriptive data) indicative of a sentiment of a user with respect to a particular interaction. For example, as will be described in further detail below, the journey mapping system 108 identifies attributes about different interactions including, but not limited to, social customer relationship management text, live chat text, survey ratings, interaction length, time between interactions, previous and/or subsequent interactions, etc.

As will be described in further detail below, the journey mapping system 108 determines a measurement of sentiment (e.g., user satisfaction or dissatisfaction) associated with a given interaction based on the identified attributes. In particular, in one or more embodiments, the journey mapping system 108 determines a sentiment score associated with a measurement of sentiment (e.g., positive, negative, neutral) for a user with respect to a given interaction. In one or more embodiments, the journey mapping system 108 determines a sentiment score associated with each tracked interaction by each of the users 114a-n to ultimately determine a measurement of sentiment for each tracked interaction.

In one or more embodiments, the journey mapping system 108 determines a range of sentiment scores for different types of interactions based on a plurality of sentiment scores for individual interactions for the same types of interactions. Thus, the journey mapping system 108 can determine a range of sentiment scores for a number of users 114a-n including a range of positive to negative sentiments for the users 114a-n with respect to different types of interactions. In addition to generally determining a range of sentiment scores for different types of interactions, in one or more embodiments, the journey mapping system 108 further performs a statistical analysis on the sentiment scores to determine variability of sentiment scores, average sentiment scores, median sentiment scores, or other statistical metric associated with a distribution of sentiment scores for a type of interaction.

In addition to determining sentiment scores for different interactions, the journey mapping system 108 optionally aggregates information from the tracked interactions to map or otherwise identify a path of interactions (or simply "interaction path") toward a target metric. For example, the journey mapping system 108 identifies trends of interactions that a majority (or other threshold number) of the users 114a-n experience prior to arriving at a target metric (e.g., purchasing a product, registering a user-account, renewing a subscription). More particularly, the journey mapping system 108 identifies the interactions (e.g., types of interactions) most often experienced by the users 104a-n, determine a sequence of the identified interactions, and generates an interaction path including those interactions commonly experienced leading up to the target metric.

Additionally, as will be described in further detail below in connection with FIGS. 3A-3E, the journey mapping system 108 generates and provides a presentation of the interaction path to a user 120. In particular, as shown in FIG. 1, the journey mapping system 108 generates and provides the presentation to the user 120 by causing the server device(s) 102 to provide presentation data to the client device 116. Upon receiving the presentation data, the presentation application 118 causes the client device 116 to display or otherwise present the presentation to the user 120 including a visualization of the interaction path and a visualization of sentiment scores associated with interactions that make up the interaction path. As will be described in further detail below, in one or more embodiments, the presentation application 118 facilitates interactive features and functionality with respect to the presentation provided via the client device 116. For example, in response to receiving one or more user inputs, the presentation application 118 filters or otherwise modifies a presentation displayed on the client device 116 in accordance with one or more embodiments described herein.

Figure 2:
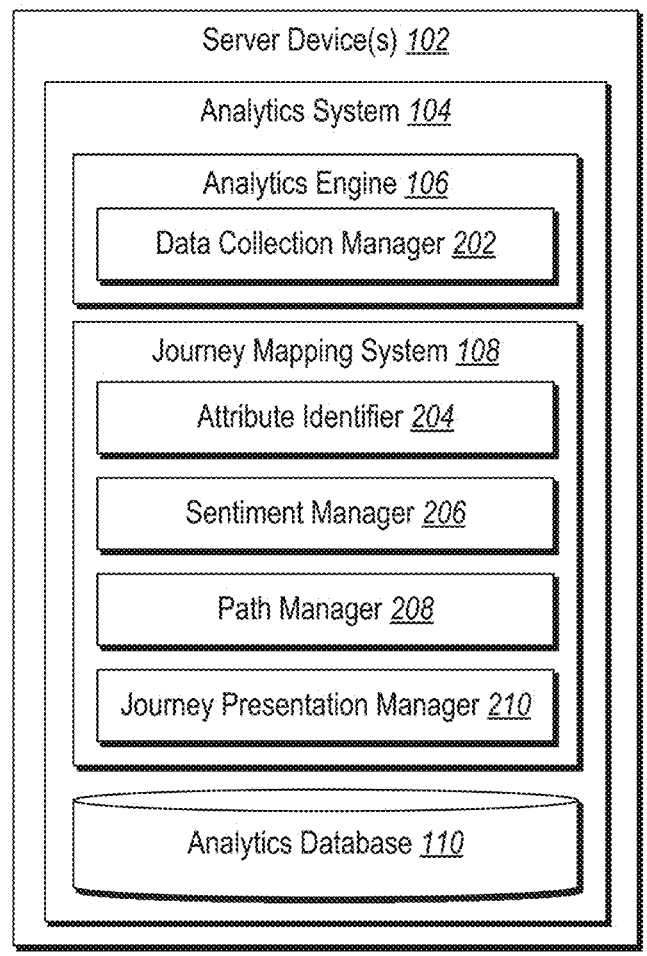
FIG. 2 illustrates a schematic diagram of the server device(s) of FIG. 1 including an analytics system and journey mapping system in accordance with one or more embodiments.

FIG. 2 illustrates a schematic diagram of an example embodiment of the server device(s) 102 including the analytics engine 106, journey mapping system 108, and analytics database 110 shown in FIG. 1. As further shown in FIG. 2, the analytics engine 106 includes a data collection manager 202. In addition, the journey mapping system 108 includes an attribute identifier 204, sentiment manager 206, path manager 208, and journey presentation manager 210. Although FIG. 2 illustrates the components 106-108 and 202-210 to be separate, any of the components 106-108 or 202-210 may be combined into fewer components, such as into a single facility or module or divided into more components as may be suitable for one or more embodiments. In addition, the components 106-108 or 202-210 may be located on or implemented by one or more computing devices, such as those described below in relation to FIG. 6.

In addition, components 106-108 and 202-210 can comprise software or hardware or a combination of software and hardware. For example, the components 106-108 and 202-210 can comprise one or more instructions stored on a non-transitory computer readable storage medium that are executable by a processor of one or more computing devices. When executed by the one or more processors, the computer-executable instructions of the analytics system 104 cause computing device(s) to perform the methods described herein. Alternatively, the components 106-108 and 202-210 can comprise a special-purpose processing device to perform a certain function. Additionally, or alternatively, the components 106-108 and 202-210 can comprise a combination of computer-executable instructions and hardware.

As mentioned above, the analytics engine 106 includes a data collection manager 202. The data collection manager 202 collects or otherwise tracks analytics data including information about interactions between the users 114a-n and an online entity. For example, in one or more embodiments, the data collection manager 202 collects analytics data including information about a user involved with the interaction. In particular, the collected analytics data can include a unique identifier of a user, an identifier of one of a plurality of client devices associated with the user, and other information associated with the user. For instance, the user information includes demographic information (e.g., age, gender). The user information can also include a classification or categorical data associated with the user. As an example, the user information includes categorical information about the user based on a client relationship with the online entity (e.g., current subscriber, former subscriber), a classification of the user based on one or more contact devices (e.g., iPhone user, Android user), or other determined category for a respective user based on received user data (e.g., early adopter, high engagement user, loyal user).

In addition to collecting information about a user involved with an interaction, the data collection manager 202 optionally further collects analytics data about the interaction itself. For example, the collected analytics data can include a timestamp associated with an interaction. In one or more embodiments, the collected analytics data includes multiple timestamps associated with a given interaction (e.g., a timestamp for the beginning and ending of an interaction). As another example, the analytics data includes an identification of a type of interaction (e.g., an interaction identifier). As a further example, the analytics data includes an identification of a communication channel (e.g., website, mobile app, email) over which the interaction occurred. The analytics data, in one or more embodiments, further includes other raw data including text, digital content, or an identification of one or more locations (e.g., on the analytics database 110) where additional data associated with the interaction is stored.

The data collection manager 202 also can collect information associated with a sequence or pattern of interactions. For example, the data collection manager 202 identifies one or more previous interaction and/or subsequent interactions that occur prior to or after any given interaction for a user. In addition, the data collection manager 202 detects or otherwise identifies deviations from common trends or predetermined paths of interactions (e.g., a desired path of interactions).

Moreover, in one or more embodiments, the data collection manager 202 collects information associated with a conversion of a product or fulfillment of a target metric. For example, the data collection manager 202 detects that a given interaction is in a sequence of events that eventually results in a purchase or other conversion event. As such, the data collection manager 202 additionally tracks or otherwise collects conversion information (which interacts lead to a conversion).

The data collection manager 202 tracks the analytics data in a variety of ways. For example, in one or more embodiments, the data collection manager 202 causes the server device(s) 102 and/or third-party server to track user data (e.g., user behavioral data) and report the tracked user data for storage on the analytics database 110. In one or more embodiments, the data collection manager 202 receives tracked interaction data directly from the contact devices 112a-n via data stored on the contact devices 112a-n (e.g., browser cookies, cached memory), embedded computer code (e.g., tracking pixels), a user profile, or using various types of tracking techniques. Thus, the data collection manager 202 collects or otherwise receives tracked interaction data including information about various types of interactions with respect to the users 114a-n associated with the respective interactions. As the users 114a-n of the contact devices 112a-n experience or otherwise participate in interactions with an online entity, the analytics engine 106 collects and compiles interaction data including information associated with each of the respective interactions.

As mentioned above, and as shown in FIG. 2, the analytics system 104 includes the journey mapping system 108 having an attribute identifier 204. In one or more embodiments, the attribute identifier 204 analyzes the collected analytics data and identifies one or more attributes associated with corresponding interactions. In particular, for each tracked interaction, the attribute identifier 204 identifies one or more attributes indicative of a positive and/or negative sentiment for a given interaction. Examples of attributes that the attribute identifier 204 may identify include, but are not limited to, social customer relationship management (CRM) text, live chat text, survey ratings, interaction length, visit length (e.g., length of time spent visiting a website), length of time viewing an advertisement, length of time between receiving an advertisement and clicking the advertisement, repeat video views, time between interactions, whether an interaction eventually results in a conversation event and/or whether the user associated with the interaction eventually fulfills a target metric.

In addition, attributes can include an identification of one or more previous or subsequent interactions to a present interaction. Further, attributes include identified deviations from a common path of interactions and/or an identification of traditionally negative and/or positive interactions preceding or following a given interaction. As an example, where a user visiting a website suddenly logs off and engages in a live chat with a help desk, the attribute identifier 204 can identify one or more attributes including the sequence of interactions, a deviation from a traditional path of interactions, as well as identify that the live chat as a traditionally negative and/or positive event in the sequence of interactions.

In one or more embodiments, the attribute identifier 204 identifies different attributes for different types of interactions. Thus, while the attribute identifier 204 may identify certain attributes applicable to most or all types of interactions, the attribute identifier 204 may identify some attributes for a limited number of interactions. For example, while the attribute of an identified number of video views applies to an interaction of a user receiving a video advertisement, the same attribute (number of video views) would not similarly apply to an interaction of the user engaging a live chat with an online help desk. Nevertheless, a length between an interaction and a subsequent interaction may apply to both types of interactions. Additional detail with regard to identifying different sets of attributes for different types of interactions is described below in connection with FIGS. 4-5.

As further shown in FIG. 2, the journey mapping system 108 includes a sentiment manager 206 that determines a sentiment score for an interaction based on identified attributes for the interaction. In general, the sentiment manager 206 generates or otherwise determines a sentiment score including a measurement (e.g., numeric value) indicative of a level of positive or negative sentiment associated with a respective interaction. For example, in one or more embodiments, the sentiment manager 206 generates a measurement from 1 to 10 or another range based on one or a combination of identified attributes.

In one or more embodiments, the sentiment manager 206 determines a sentiment score based on an analysis of the identified attributes for an interaction. For example, as mentioned above, the attribute identifier 204 identifies a number of attributes including, for example, text from the interaction, a duration of the interaction, and an identification of a previous interaction between the user and the online entity. In an example where the interaction refers to a live chat with a help-desk, the sentiment manager 206 determines sentiment values associated with each of the attributes and combine the values into a sentiment score for the interaction. For instance, the sentiment manager 206 may analyze the text (e.g., length of text strings, identification of key words and phrases) of the interaction and determine a net positive sentiment value.

In one or more embodiments, the sentiment manager 206 can determine the sentiment of an interaction utilizing natural language processing. For example, the sentiment manager 206 can utilize natural language processing to parse a text associated with an interaction (e.g., a transcript) utilizing natural language processing to identify parts of speech tags and lexical chains. Accordingly, the sentiment manager 206 can identify one or more adjectives and/or adverbs in a transcript or message that indicate a sentiment associated with the keyword, an entity, or a theme. Based on the identified one or more adjectives and/or adverbs, the sentiment manager 206 may assign a sentiment to the interaction.

For example, the sentiment manager 206 may utilize grammars, databases, web searches, or other rules in order to determine whether the identified one or more adjective and/or adverbs can be used to assign a sentiment. In one or more embodiments, a sentiment is positive, negative, neutral, etc. Accordingly, in one example, the sentiment manager 206 may use standard dictionary-type lookups to determine that an adverb such as, "badly" is generally associated with a negative sentiment. Furthermore, the sentiment manager 206 may assign a weight to an identified sentiment, such that the identified sentiment may fall within a spectrum of sentiments (e.g., strongly positive, weakly negative, and so on). In one or more embodiments, the sentiment manager 206 can assign weights based on dictionary lookups, databases, rules, etc.

Additionally, or alternatively, if a transcript or message has multiple phrases or sentences, the sentiment manager 206 may analyze sentiments at a phrase or sentence level, or may analyze sentiments across the full transcript or document. For example, a social media post may contain the text, "I love Brand Y! I just wish it wasn't so expensive." Accordingly, this single post contains two phrases. In one or more embodiments, the sentiment manager 206 may analyze each phrase separately to determine a sentiment of each phrase (e.g., "I love Brand Y!" has a strong positive sentiment, "I just wish it wasn't so expensive" has a mildly negative sentiment). Alternatively, the sentiment manager 206 may analyze the post as a single document. In that case, the sentiment manager 206 may determine the post is associated with an overall weakly positive sentiment.

In further embodiments, the sentiment manager 206 may determine implied sentiment. For example, rather than relying upon express text, the sentiment manager 206 can imply sentiment based on user actions. For example, the sentiment manager 206 can determine a net negative sentiment value based on a long duration (e.g., a duration exceeding a threshold period of time) of the live chat. The sentiment manager 206 may further determine a net negative sentiment value based on a preceding interaction (or series of interactions) with respect to a web interface where the user searched a frequently asked question (FAQ) section (and was presumably unable to find an answer to a question). The sentiment manager 206 may determine implied sentiment based on the length of time of an interaction, the length of time between interactions, the order of interactions, the interactions in a customer journey etc.

In the above example involving a live chat interaction, the sentiment manager 206 may aggregate the sentiment values for the different attributes to determine a cumulative positive or negative sentiment score associated with the live chat interaction. For instance, because the identified negative attributes (e.g., attributes associated with negative sentiment values) exceed a number of positive attributes, the sentiment manager 206 may determine an overall negative sentiment score for the live chat interaction.

Alternatively, in one or more embodiments, the sentiment manager 206 weights the attributes differently based on a determined significance of the attributes. For instance, with respect to the example involving the live chat interaction, the sentiment manager 206 may determine (e.g., based on a history of interactions having similar identified attributes) that the text of the live chat provides a better indication of sentiment than any other attribute and weights the sentiment value associated with the text of the live chat more heavily than other identified attributes. In addition, while the length of the interaction may still influence the overall sentiment score, the sentiment manager 206 may nonetheless determine that the length has a relatively small influence on the overall user sentiment with respect to the interaction and weight the sentiment value for the long duration of the interaction less heavily than other attributes. As a result, the sentiment manager 206 may determine, based on the positive sentiment value associated with the analysis of the text, a neutral or more positive sentiment score associated with the live chat interaction notwithstanding other attributes associated with negative sentiment values.

In addition to considering attributes differently based on interaction-types, the sentiment manager 206 can further apply different weights to different attributes based on a user profile or user data for users involved with the interactions. For example, the sentiment manager 206 weights certain attributes differently for younger users than for older users. As another example, the sentiment manager 206 weights attributes across different communication channels differently for early adopters or loyal users (e.g., users that are more likely to have a greater familiarity with a mobile application interface) than for new customers or low engagement users.

It will be understood that the attribute identifier and the sentiment manager 206 cooperatively determine sentiment sores for interactions based on a plurality of identified attributes. For example, in one or more embodiments, the attribute identifier 204 and sentiment manager 206 identify attributes and determine sentiment scores based on a model generated by the journey mapping system 108. In particular, in one or more embodiments, the journey mapping system 108 generates a model including defined relationships between attributes and sentiment values for those attributes. As an example, the journey mapping system 108 generates a model including a table, chart, or other data structure that includes one or more identified attributes (or specific combinations of attributes) for each type of interaction known to correspond to a measurement of user sentiment for each type of interaction. Thus, when analyzing analytical data to identify attributes, the attribute identifier 204 selectively identifies attributes corresponding to the interaction-type of the tracked interaction. In addition, the sentiment manager 206 analyzes the identified attributes in accordance with the model to determine sentiment scores for interactions of the interaction-type.

In one or more embodiments, the journey mapping system 108 generates the model using a machine learning. For example, the journey mapping system 108 utilizes training data including interactions and associated interaction information (e.g., user information, behavioral information) for which sentiment has been accurately determined. In addition, the training data can include information associated with whether an interaction ultimately resulted in a conversion or other target metric. Using the training data, the journey mapping system 108 generates algorithms and/or trains a machine learning model that accurately determines sentiment scores for subsequently tracked interactions. Over time, the journey mapping system 108 refines the model and algorithms to reflect additional information about correlations between identified attributes and user sentiment.

Thus, the sentiment manager 206 calculates or otherwise determines a sentiment score for each interaction for a plurality of users (e.g., users 114a-n). In one or more embodiments, the sentiment manager 206 additionally determines a range of sentiment scores for types of interaction based on individual sentiment scores for interactions of similar types (e.g., interactions having the same interaction identifier). For example, the sentiment manager 206 determines a range from a lowest sentiment score to a highest sentiment score for interactions of the same interaction-type.

In one or more embodiments, the sentiment manager 206 eliminates or otherwise minimizes the effect of outliers (e.g., outlying sentiment scores). In particular, where a small percentage of sentiment scores fall outside the range of a predefined percentage (e.g., 50%, 75%, 90%) or a predefined deviation from a distribution of the determined sentiment scores, the sentiment manager 206 can discard or otherwise exclude the sentiment scores that fall outside the predefined percentage or deviation. In this way, the sentiment manager 206 can provide a range of sentiment scores that accurately reflects user sentiment without getting thrown off by experimental error or individual user variability.

As further shown in FIG. 2, the journey mapping system 108 includes a path manager 208 that generates a path of interactions (or simply "interaction path") including a plurality of interactions (e.g., types of interactions) commonly experienced by users prior to fulfilling a target metric (e.g., purchasing a product). In particular, in one or more embodiments, the path manager 208 identifies trends of interaction-types that users 114a-n experience leading up to a target metric based on analysis of the interaction information collected by the analytics engine 106. In addition, because the interaction data includes user-specific information, the path manager 208 identifies a sequence of any number of interactions experienced by individual users who arrived or otherwise fulfilled the target metric.

In one or more embodiments, the path manager 208 identifies the interaction path by aggregating interactions from a plurality of users to determine which interaction-types occur most frequently for users that arrive (or come close to arriving) at the target metric. In particular, the path manager 208 can identify a number of interactions that users experience and determine which interactions occur more frequently based on a threshold number of instances of interaction-types. For example, the path manager 208 identifies those interactions that occur a threshold number of times. In addition, or as an alternative, the path manager 208 identifies interactions that a predefined percentage (e.g., a majority) of the users experiences leading up to a target metric.

Thus, in one or more embodiments, the path manager 208 only identifies a subset of interaction-types that occur for the plurality of users associated with a target metric. For example, while the data collection manager 202 may identify hundreds of different interactions that the plurality of users experience, the path manager 208 may only identify the ten most common (or other predefined number) interactions to include within the interaction path. In one or more embodiments, the path manager 208 identifies a plurality of interactions that occur a threshold number of times and includes those interactions within the interaction path. As will be described in further detail below, the journey mapping system 108 may further limit the number of interactions included within a presentation of the interaction path based on additional criteria (e.g., a received user input, an applied filter).

While the path manager 208 may specifically consider interactions for users that experience or otherwise fulfill a target metric, the path manager 208 may additionally consider interactions for users who do not necessarily perform or otherwise fulfill the target metric. For instance, where certain users follow some, or all, of the interactions of the interaction path, but fail to arrive at the target metric, the path manager 208 may additionally consider those interactions when generating the interaction path. As an example, where a user follows a majority of interactions that make up a common interaction path, but drops off or otherwise fails to convert, the path manager 208 may additionally consider these interactions when generating the interaction path, as they may still provide relevant data for determining the interaction path.

In one or more embodiments, the path manager 208 determines multiple interaction paths corresponding to different target metrics. In particular, in one or more embodiments, the path manager 208 determines interaction paths that lead to different target interactions (or other metrics). In one or more embodiments, the path manager 208 determines interaction paths that lead to desirable actions of users associated with the interactions (e.g., registering an account, downloading software, making a purchase, renewing a subscription). Alternatively, in one or more embodiments, the path manager 208 determines interaction paths that lead to undesirable actions of users associated with the interactions (e.g., unsubscribing from receiving emails, returning a product, discontinuing communication beyond a threshold period of time with the online entity).

In addition to generally identifying interactions commonly experienced by users leading up to a target metric, the path manager 208 can further determine a common order or sequence of the interaction. For example, the path manager 208 determines a most common order of the interactions leading up to the target metric and generates the interaction path based on the determined most common order. As another example, the path manager 208 identifies which individual interactions occur at different stages in the process of arriving at the target metric, and orders the interactions of the interaction path accordingly.

In addition to generating different interaction paths for different target metrics, in one or more embodiments, the path manager 208 determines or otherwise generates different interaction paths for the same target metric corresponding to different segments of users. For example, in one or more embodiments, the path manager 208 generates different interaction paths for the same target metric for each segment of users associated with the tracked interactions. As an example, the path manager 208 may generate a first interaction path including a path of interactions commonly experienced by early adopters. As another example, the path manager 208 may generate a second interaction path including a path of interactions commonly experienced by new customers. In one or more embodiments, the interaction paths for different segments include different interactions and/or different sequences of the same interactions. For instance, early adopters may more frequently interact with an online entity via a mobile application while new customers more frequently interact with the online entity via a web interface.

In one or more embodiments, the path manager 208 generates the interaction path including those interactions most common across different communication channels. For example, rather than identifying the interactions most commonly experienced based solely on the number of tracked interactions (or percentage of users who experienced the tracked interactions), the path manager 208 can identify the most common interactions for different communication channels to show an interaction path across different channels of communication. For example, the path manager 208 may prioritize including at least one interaction from each of communication channels including, but not limited to, web-based interactions, mobile application-based interactions, call center or help desk-based interactions, and delivered content-based interactions. As such, where certain communication channels may be overrepresented due to a sheer number of interactions (e.g., interactions with respect to web content may greatly outnumber interactions with respect to a help-desk), the path manager 208 may prioritize other communication channels to ensure a representation of different communication channels in the interaction path.

As further shown in FIG. 2, the journey mapping system 108 includes the journey presentation manager 210 that generates a presentation of the interaction path including a visualization of sentiment scores (e.g., ranges of sentiment scores) for the interactions that make up the interaction path. For example, in one or more embodiments, the journey presentation manager 210 generates a presentation that enables a presentation application 118 to provide a display of the presentation to a user 120 via a graphical user interface on the client device 116. As will be described in further detail below in connection with FIGS. 3A-3E, the journey presentation manager 210 can provide a presentation including different visualization and various interactive features that enable a user 120 of the client device 116 to view specific portions of the interaction information as well as modify the presentation in various ways.

It will be understood that one or more of the components 106-110, 202-210 of the analytics system 104 may, for example, be implemented as one or more stand-alone applications, as one or more modules of an application, as one or more plug-ins, as one or more library functions or functions that may be called by other applications, and/or as a cloud-computing model. Thus, one or more components 106-110, 202-210 of the analytics system 104 may be implanted as a stand-alone application, such as a desktop or mobile application. Furthermore, one or more of the components 106-110, 202-210 of the analytics system 104 may be implemented as one or more web-based applications hosted on a remote server (e.g., server device(s) 102). Alternatively, or additionally, one or more components 106-110, 202-210 of the analytics system may be implemented in a suite of mobile device applications or "apps." As an example, one or more components 106-110, 202-210 of the analytics system 104 may be implemented in one or a combination of applications including, but not limited to ADOBE® ANALYTICS® and/or MOBILE SDK®. "ADOBE®," "ADOBE® ANALYTICS®" and/or "MOBILE SDK®" are either registered trademarks or trademarks of Adobe Systems Incorporated in the United States and/or other countries.

Figure 3A:
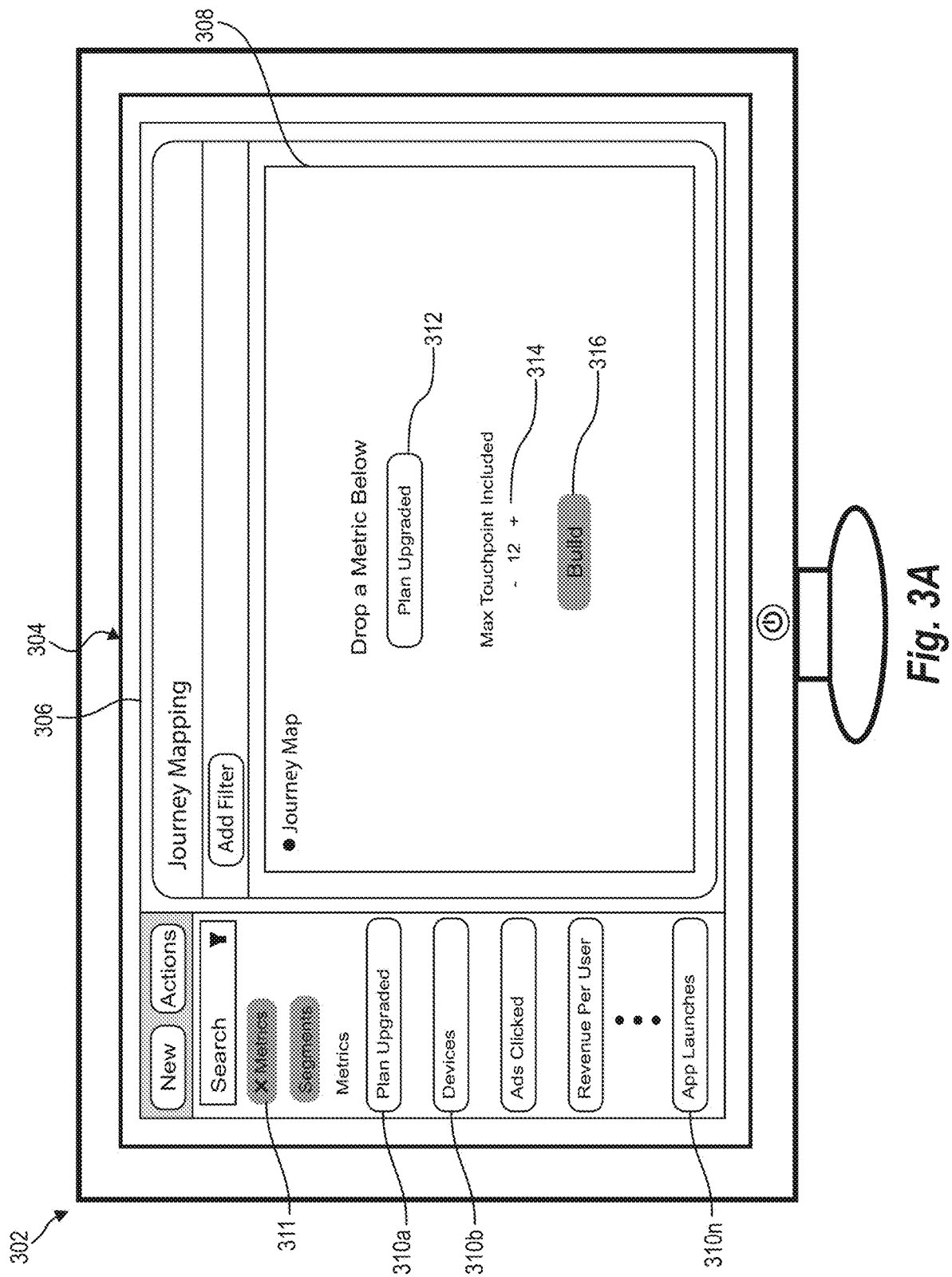
FIGS. 3A-3E illustrate example graphical user interfaces including views of a presentation of an interaction path in accordance with one or more embodiments.
Figure 3B:
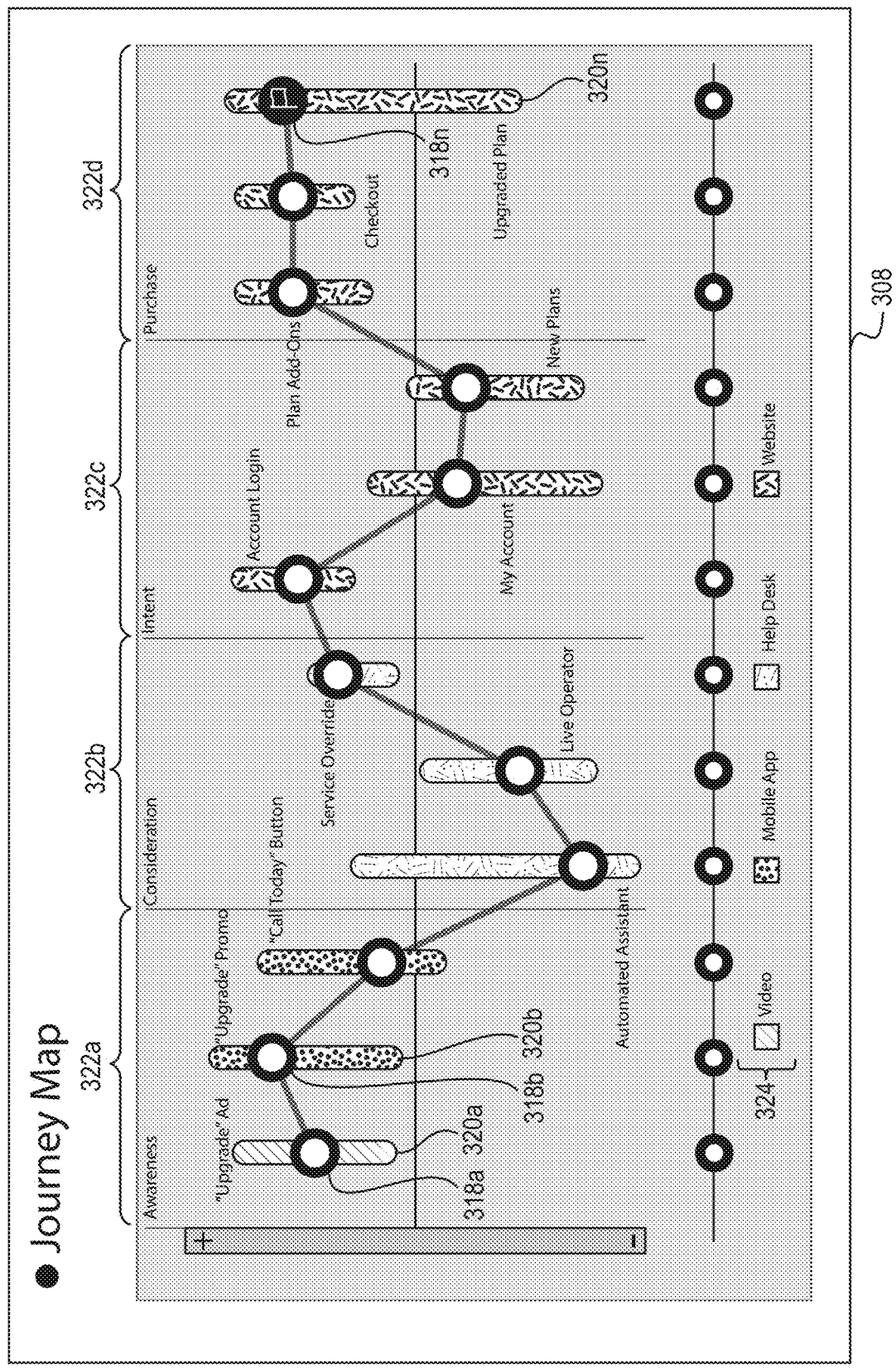
Figure 3C:
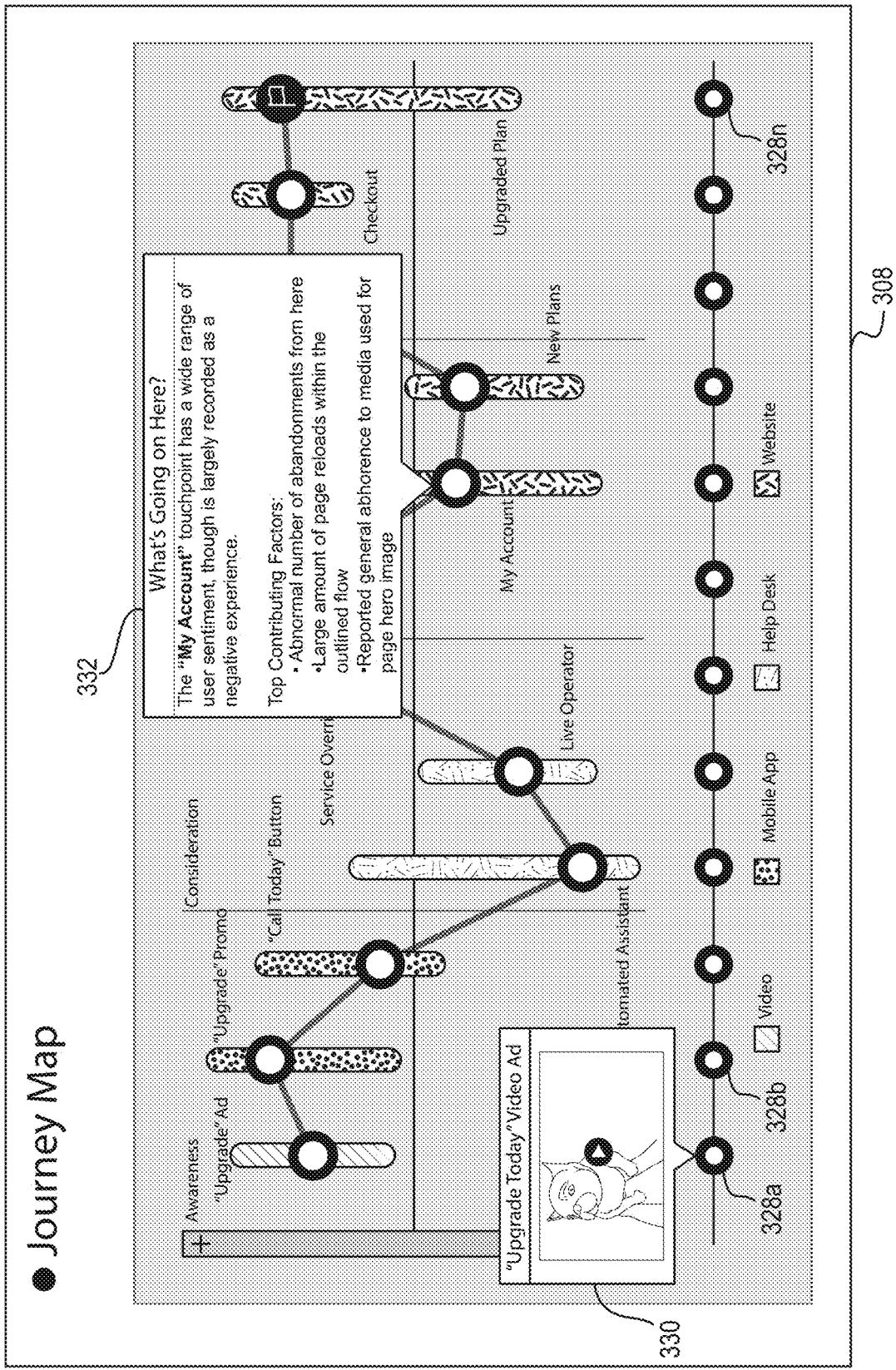
Figure 3D:
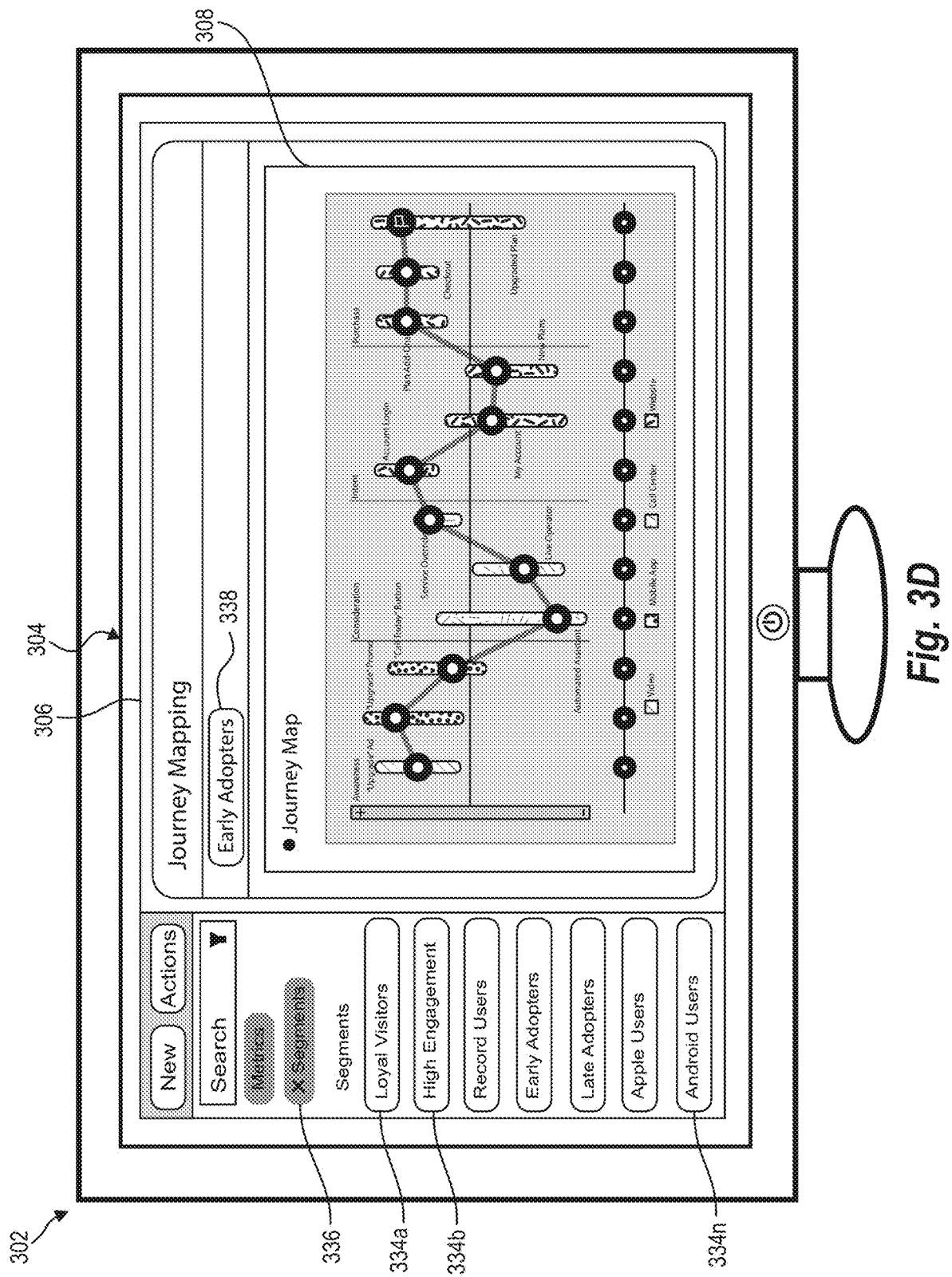
Figure 3E:
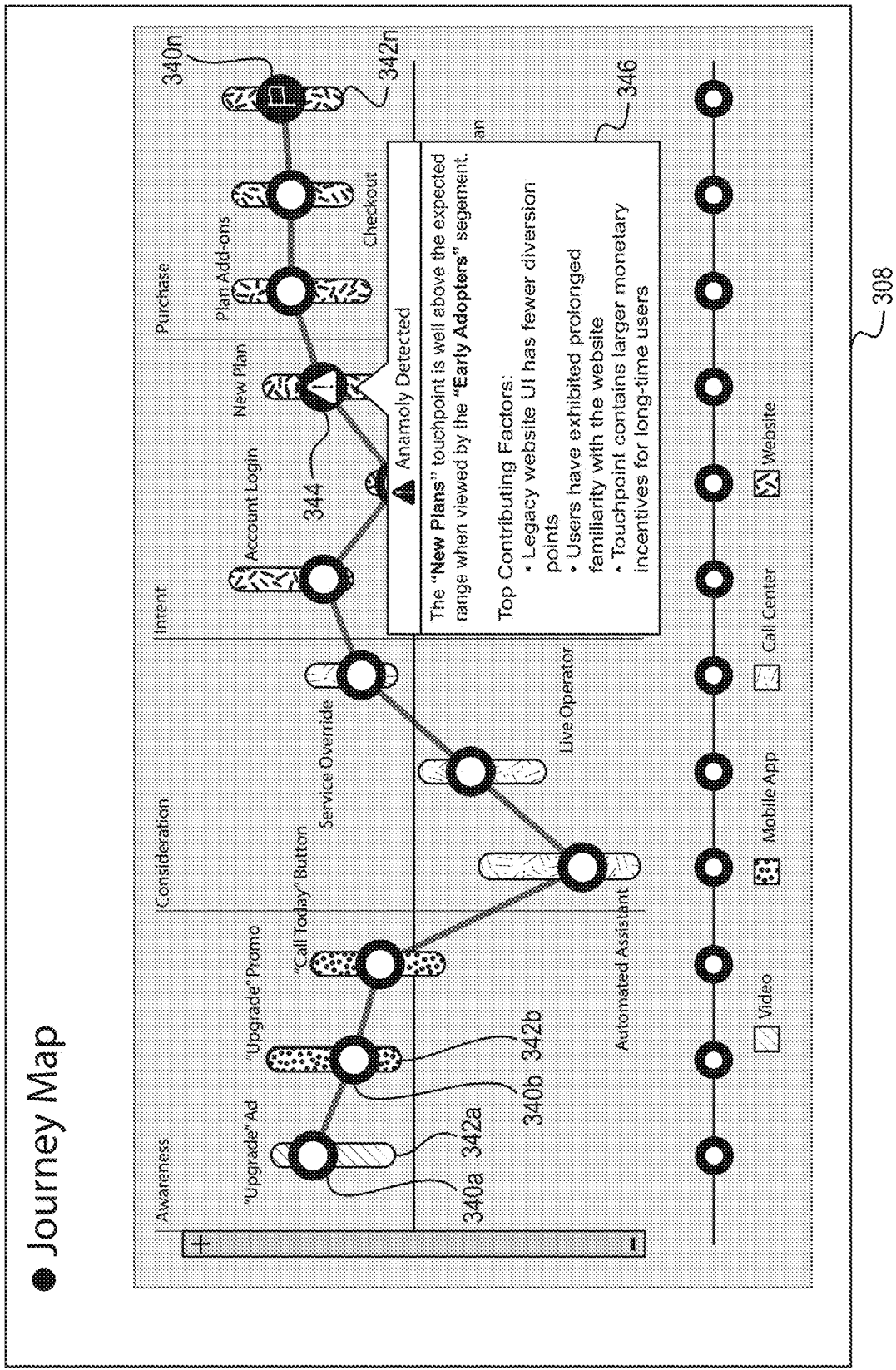

FIGS. 3A-3E illustrate, by way of example, features and functionality of the journey mapping system 108 with regard to providing an interactive presentation of a path of interactions (or simply "interactive presentation"). The path of interactions includes a visualization of types of interactions that make up the interaction path as well as a visualization of sentiment scores associated with each of the types of interactions. In particular, FIG. 3A shows an example graphical user interface including interactive features to facilitate creation of the interactive presentation. FIG. 3B shows an example interactive presentation including a visualization of an interaction path and associated sentiment scores. FIG. 3C shows the interactive presentation of FIG. 3B, including example interactive features and visualizations of interaction information associated with different types of interactions that make up the interaction path. FIG. 3D shows additional interactive features that enable a user to filter or modify the interactive presentation. FIG. 3E shows an example modified presentation in accordance with one or more detected user interactions.

In each of the examples shown in FIGS. 3A-3E, the journey mapping system 108 provides the interactive presentation to a user of a client device 302 (or simply device 302) via a graphical user interface 304 of the device 302. In addition, similar to one or more embodiments described above, the journey mapping system 108 provides the interactive presentation by providing presentation data to the device 302 having a presentation application thereon (e.g., similar to the presentation application 118 of FIG. 1) and which causes the device 302 to provide the presentation via the graphical user interface 304 of the device 302. Accordingly, the journey mapping system 108 can generate and provide an interactive presentation via the device 302 in accordance with one or more embodiments described herein.

As mentioned above, FIG. 3A shows an example graphical user interface including an interactive presentation 306 displayed thereon. The interactive presentation 306 includes a presentation space 308 within which the journey mapping system 108 provides a visualization of an interaction path and sentiment scores for interactions that make up the interaction path. As will be described by way of example in connection with FIGS. 3A-3E, the journey mapping system 108 provides a presentation space 308 including a visualization of a single interaction path for a target metric. Nevertheless, while FIGS. 3A-3E show a single presentation space 308 within the interactive presentation 306, it will be understood that the journey mapping system 108 can provide multiple presentation spaces each including visualizations of different interaction paths for different target metrics and/or different segments of users.

The interactive presentation 306 further includes a listing of target metrics as indicated by metric icons 310a-n corresponding to different target metrics. For example, the metric icons 310a-n include icons corresponding to target metrics including, but not limited to, plan upgraded, device purchase, ads clicked, revenue received, app launches, etc. The metric icons 310a-n can include a number of icons corresponding to target metrics for which the journey mapping system 108 has identified corresponding interaction paths. Alternatively, in one or more embodiments, the journey mapping system 108 aggregates the plurality of online user interactions to identify interaction paths based on a selection of one or more of the metric icons 310a-n. In one or more embodiments, the journey mapping system 108 provides the metric icons 310a-n based on detecting a user selection of the metric menu icon 311, as shown in FIG. 3A.

As shown in FIG. 3A, the interactive presentation 306 includes setting options that enable a user to customize a visualization of the interaction path. For example, the interactive presentation 306 includes a target metric identifier 312, a maximum interaction identifier 314, and a build button 316. In one or more embodiments, a user of the device 302 can interact with these and other options to customize a visualization of the interaction path(s) shown within the interactive presentation 306.

For example, a user can specify the target metric identifier 312 by selecting one of the target metric icons 310a. In one or more embodiments, a user selects the target metric identifier 312 by selecting one of the target metric icons 310a-n and dragging the selected icon to a corresponding space within the presentation space 308. For example, as shown in FIG. 3A, a user of the client device 302 selects the plan upgraded target metric icon 310a and drags the icon 310a to a dedicated space within the presentation space 308.

As further shown, the user of the device 302 can select a maximum number of interactions to include within a visualization of the interaction path. For example, as shown in FIG. 3A, a user of the device 302 indicates a maximum number of interactions to show within a visualization of the interaction path by selecting a plus or minus icon for the maximum interaction identifier 314. As shown FIG. 3A, the maximum interaction identifier 314 indicates that a maximum of twelve interactions (e.g., interaction icons) be included within a visualization of the interaction path for the selected target metric (Plan Upgraded). As such, the journey mapping system 108 may identify the twelve most frequent interactions and generate the presentation including a visualization of the interaction path including a maximum of twelve interaction-types (e.g., twelve icons corresponding to the most frequent interaction-types). Alternatively, the journey mapping system 108 may identify up to twelve interactions that have occurred more than a minimum number of times between the users involved with the tracked interactions.

In addition, once the target metric is selected and the maximum number of interactions has been selected, a user can select the build button 316 to generate a visualization of the interaction path for the plan upgraded metric. In response to detecting the user selection of the build button, the journey mapping system 108 provides a visualization of the interaction path within the presentation space 308. As an example, FIG. 3B shows an example visualization of the interaction path in accordance with the selected settings.

As shown in FIG. 3B, the visualization of the interaction path includes interaction icons 318a-n corresponding to the twelve types of interactions that make up the interaction path. In addition, the last interaction icon 318n (or target interaction) includes a flag icon showing that the last interaction of the interaction path refers to the target metric for the interaction path. As further shown in FIG. 3B, the visualization includes sentiment icons 320a-n illustrating a range of sentiment scores for a plurality of users associated with the types of interactions corresponding to the interaction icons 318a-n. For example, the visualization shown in FIG. 3B includes an elongated sentiment icon showing a range of positive to negative sentiment scores determined by the journey mapping system 108 with respect to the individual interactions.

In one or more embodiments, the journey mapping system 108 positions the interaction icons 318a-n at positions along the sentiment icons 320a-n corresponding to an average sentiment score, median sentiment score, or other statistically significant position of a determined range of sentiment scores. As such, the interaction icons 318a-n and sentiment icons 320a-n provide valuable information with regard to the distribution of sentiment scores from negative to positive.

For example, the position of the first interaction icon 318*a* at a position near the center of the first sentiment icon 320*a* shows that the determined sentiment scores are generally positive and evenly distributed across the range of sentiment scores specified by the first sentiment icon 320*a*. As another example, the position of the second interaction icon 318*b* at a position near the top of the second sentiment icon 320*b* shows that while the sentiment scores vary more widely for the second interaction than the first interaction, the sentiment scores are generally positive and distributed more positive than negative along the range of sentiment scores. As such, a user of the device 302 can quickly determine that the upgrade ad and the upgrade promo are received with generally positive sentiment from users who receive the advertisements.

As further shown in FIG. 3B, the journey mapping system 108 may provide a visualization of stages 322*a-d* associated with the interactions that make up the path of interactions. For example, the visualization of the interaction path shown in FIG. 3B includes four stages 322*a-d* corresponding to stages of the user experience leading up to the target metric. In particular, the journey mapping system 108 can assign interactions to respective stages including, but not limited to, an awareness stage 322*a*, a consideration stage 322*b*, an intent stage 322*c*, and a purchase stage 322*d*. In this way, a user of the device 302 can see which interactions correspond to stages of awareness and easily comprehend sentiment associated with the different stages.

The visualization shown in FIG. 3B additionally includes a channel key 324 showing patterns associated with communication channels over which the interactions corresponding to the interaction icons 318*a-n* occur. In particular, as shown in FIG. 3B, the sentiment icons 320*a-n* include patterns corresponding to the patterns of the channel key 324 that indicate whether the interaction(s) occur over video, a mobile app, a help desk, or via a website. The channel key 324 can include fewer or additional channel indicators and may include a variety of colors, patterns, or other visual indicators that indicate a communication channel corresponding to each of the types of interactions along the interaction path.

In one or more embodiments, the journey mapping system 108 provides additional information with respect to individual interactions. For example, as shown in FIG. 3C, the journey mapping system 108 provides, within the presentation space 308, asset icons 328*a-n* corresponding to each of the interactions of the interaction path. In response to detecting a user selection of the first asset icon 328*a*, the journey mapping system 108 provides a video asset 330 including an upgrade today video advertisement corresponding to the first interaction of the interaction path. In this way, the journey mapping system 108 provides a ready reference of the digital video for viewing by a user of the device 302. The journey mapping system 108 can similarly provide assets including, for example, videos, emails, logs of user interactions, screen shots, survey results, or other analytics data (or identified attributes) associated with each of the interactions along the interaction path.

As further shown in FIG. 3C, the journey mapping system 108 can provide additional information with respect to sentiment scores for the individual interactions. For example, as shown in FIG. 3C, the journey mapping system 108 provides a sentiment window 332 including information about the determined range of sentiment score for a selected interaction. In particular, in response to detecting a user selection of an interaction icon corresponding to an interaction of "My Account" (e.g., referring to tracked activity of a user after logging into a user account), the journey mapping system 108 provides the sentiment window 332 within the presentation space 308.

As shown in FIG. 3C, the sentiment window 332 includes a general description of the range of sentiment scores. For instance, because the range of sentiment scores exceeds a threshold range of scores, the journey mapping system 108 provides an explanation that the "My Account touchpoint (e.g., interaction) has a wide range of user sentiment." In addition, because the majority of the sentiment scores fall below a neutral line of user sentiment, the journey mapping system 108 further includes a description that the interactions are "largely recorded as a negative experience."

In addition to the general description of the sentiment scores, the sentiment window 332 can include bullet points, a list of attributes, or other description of contributing factors associated with the selected interaction. For example, as shown in FIG. 3C, the journey mapping system 108 provides bullet points including "top contributing factors" based on the identified attributes associated with the interaction. As shown in FIG. 3C, the top contributing factors for the selected interaction having a wide range of user sentiment and being a largely negative experience include various identified attributes, including, for example, "abnormal number of abandonments from here," "large amount of page reloads within the outlined flow," and "reported general abhorrence to media user for page image." While the selected interaction may include additional contributing factors, the journey mapping system 108 can identify those attributes that contributed most heavily to the sentiment score.

In one or more embodiments, the journey mapping system 108 provides various filter controls to enable a user of the device 302 to modify the presentation within the presentation space 308. As an example, the journey mapping system 108 can provide controls that enable a user to increase or decrease the number of interactions shown within the visualization of the interaction path. As another example, the journey mapping system 108 provides controls that enable a user to focus on a particular stage of the interaction path. For instance, in response to detecting a user selection of icons corresponding to the "awareness," "consideration," "intent," or "purchase" stages, the journey mapping system 108 can provide, within the presentation space 308, a number of interactions unique to the selected stage of the customer journey. In one or more embodiments, the journey mapping system 108 provides a presentation of the interactions unique to the selected stage of the customer journey while excluding other interactions from the presentation space 308.

As another example, the journey mapping system 108 provides controls that enable the user to focus on interactions associated with a particular channel of communication. For instance, in response to detecting a user selection of an icon (e.g., within the channel key 324) corresponding to different types of communication channels, the journey mapping system 108 provides a modified presentation that includes only those interactions that occur over a communication channel corresponding to the selected icon. Alternatively, in one or more embodiments, the journey mapping system 108 excludes interactions from a communication channel (while including interactions from other communication channels) based on detecting a user selection of an icon from the channel key 324.

FIG. 3D shows an additional example in which the journey mapping system 108 provides one or more filter controls to modify a presentation of the interaction path based on a selected user segment. For example, as shown in FIG. 3D, the graphical user interface 304 includes a listing of user segments as indicated by segment icons 334a-n corresponding to different segments of users involved with a plurality of interactions. For example, the segment icons include icons corresponding to respective segments of users including, but not limited to, loyal visitors, high engagement users, record users, early adopters, late adopters, apple users, and android users. The segment icons 334a-n can include a number of icons corresponding to respective segments of users involved with the interactions visualized with the interaction path. In one or more embodiments, the journey mapping system 108 provides the segment icons 334a-n (e.g., in lieu of the metric icons 310a-n) based on detecting a user selection of the segment filter icon 336, as shown in FIG. 3D.

In one or more embodiments, the journey mapping system 108 filters the interaction path based on detecting a selection of a user segment. For example, in one or more embodiments, a user selects a user segment by selecting one of the segment icons 334a-n and dragging the selected segment icon to a designated space. As shown in FIG. 3D, a user can apply a filter for early adopters by selecting the segment icon for early adopters and dragging the early adopters segment icon to a filter space 338 positioned above the presentation space 308.

In response to applying a segment filter, the journey mapping system 108 modifies the visualization of the interaction path to include a path of interactions and associated ranges of sentiment scores particular to the selected segment. In one or more embodiments, the journey mapping system 108 modifies the visualization by changing the interactions of the interaction path to reflect the interactions most frequently experienced by the users of the selected segment. Alternatively, as shown in FIG. 3E, the journey mapping system 108 modifies the visualization by providing modified interaction icons 340a-n and modified sentiment icons 342a-n for the same interactions as the interaction path prior to detecting the selection of the selected segment.

FIG. 3E shows a filtered interaction path based on the selected segment of "early adopters." As shown, the filtered interaction path includes modified interaction icons 340a-n and associated sentiment icons 342a-n. Similar to one or more embodiments described above, the modified interaction icons 340a-n have a position along a spectrum of user sentiment corresponding to an average sentiment score, median sentiment score, or other statistically significance position along the ranges of sentiment scores indicated by the associated sentiment icons 342a-n.

As shown in FIG. 3E, the positions of the modified interaction icons 340a-n and length of the modified sentiment icons 342a-n are different than the interaction icons 318a-n and sentiment icons 320a-n described above in connection with FIGS. 3A-3D to reflect different sentiment scores for early adopters involved with the interactions from the sentiment scores from the general population of users. As shown in FIG. 3E, the early adopters have more negative interactions with regard to call-center interactions (e.g., automated assistant, live operator, service override) in comparison to general users. However, FIG. 3E also shows that early adopters have more positive interactions with respect to interactions that take place over the website (e.g., account login, my account, new plans, plan add-ons, etc.) than general users.

In addition to generally providing modified information with regard to determined sentiment scores for the selected segment of users, the journey mapping system 108 further provides anomalies with respect to filtered segments when compared to a more general population of users. For example, FIG. 3E shows an anomaly icon 344 including an indication that the journey mapping system 108 has detected an anomaly with respect to a placement of a corresponding interaction icon and/or a range of a corresponding sentiment icon. For instance, as shown in FIG. 3E, the interaction icon for "New Plans" includes an anomaly icon 344 indicating an anomaly for early adopters with respect to the "New Plans" interaction.

In response to detecting a user selection of the anomaly icon 344, the journey mapping system 108 can provide an anomaly window 346 including information about the detected anomaly. In particular, as shown in FIG. 3E, the anomaly window 346 includes a plain text description that "The 'New Plans' interaction is well above the expected range when viewed by the 'Early Adopters' segment." In one or more embodiments, the journey mapping system 108 determines the anomaly and provides the anomaly icon 344 and associated anomaly window 346 based on determining that the range and/or average (or other statistically significant metric) sentiment score differs from the general range or average by a predetermined threshold.

As further shown in FIG. 3E, the anomaly window 346 includes a listing of contributing factors (e.g., attributes) associated with the selected segment of users that contribute to the detected anomaly. For example, as shown in FIG. 3E, the anomaly window 346 includes a bullet point list of contributing factors including "Legacy web site UI has fewer diversion points," "Users have exhibited prolonged familiarity with the website," and "Interaction contains larger monetary incentives for long-time users." In one or more embodiments, the journey mapping system 108 selects pre-selected contributing factors (e.g., pre-filled descriptions of the contributing factors) based on identified combinations of attributes and associated sentiment scores (e.g., corresponding to a selected user segment) associated with a selected interaction.

In addition to generating and providing the presentation including the visualization of the presentation path, in one or more embodiments, the journey mapping system 108 further enables a user of the device 302 to share the presentation or portion(s) of the presentation with one or more additional users. For example, in one or more embodiments, the journey mapping system 108 provides an option to share a visualization of an interaction path associated with a target metric as shown within a presentation space 308. In particular, the journey mapping system 108 enables a user to share a visualization of the interaction path including, for example, any of the visualized features described in connection with FIGS. 3A-3E.

FIGS. 1-3E, the corresponding text, and the examples, provide a number of systems and devices that enable the journey mapping system 108 to aggregate interaction information and generate a presentation including a visualization of an interaction path in accordance with one or more embodiments described herein. In addition to the foregoing, embodiments can also be described in terms of flowcharts comprising acts and steps in a method for accomplishing a particular result. For example, FIG. 4 illustrates a flowchart of an exemplary method in accordance with one or more embodiments.

Figure 4:
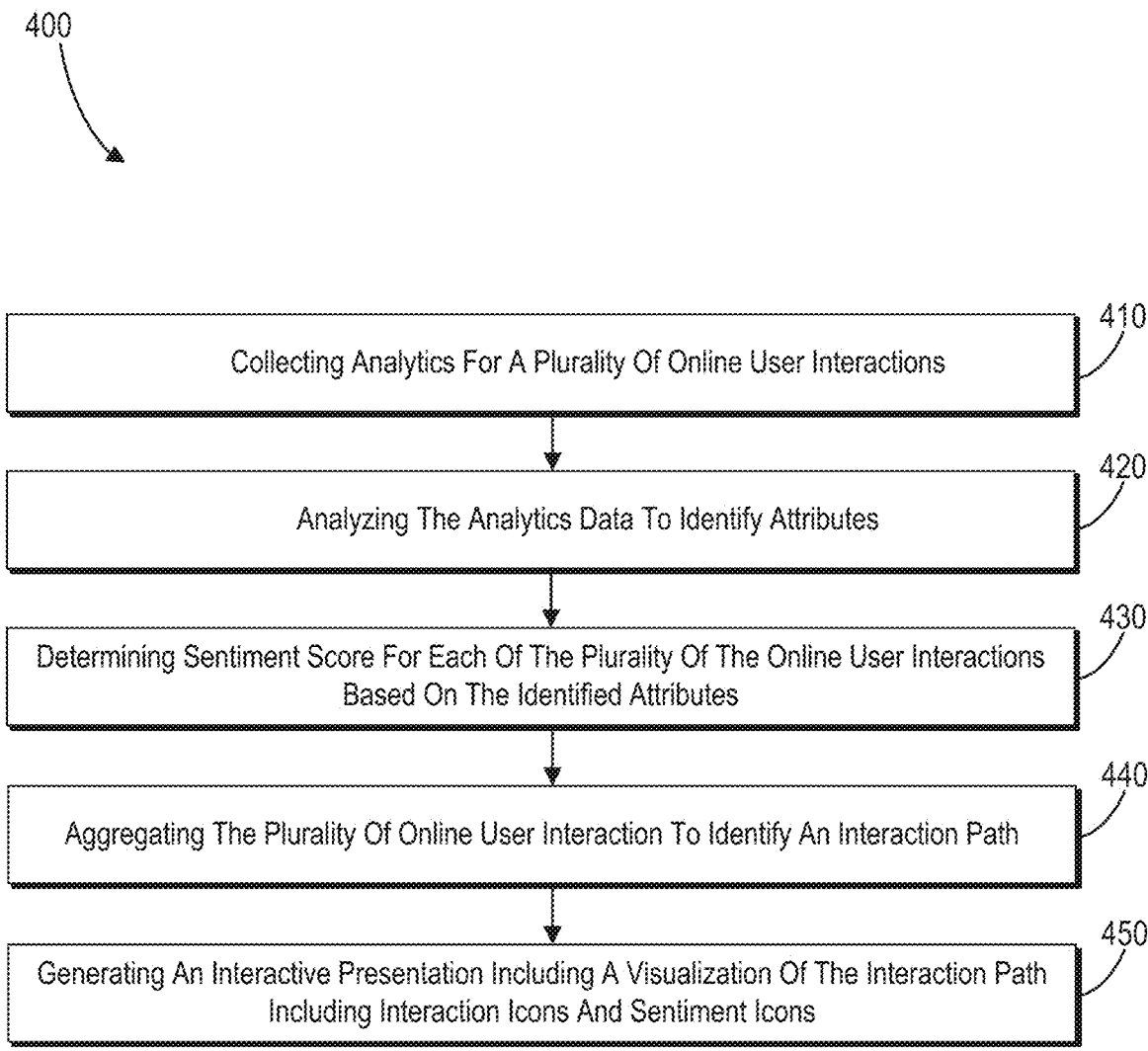
FIG. 4 illustrates a flow diagram of mapping and presenting a touchpoint path in accordance with one or more embodiments.

FIG. 4 illustrates a flowchart of an example method 400 for aggregating interaction information and generating a presentation including a visualization of an interaction path. As shown in FIG. 4, the method 400 includes an act 410 of collecting analytics data for a plurality of online user interactions. For example, in one or more embodiments, the act 410 includes collecting, by a server device(s) 102, analytics data for a plurality of online user interactions for a plurality of users 114*a-n* with respect to an online entity. In one or more embodiments, the method 400 includes collecting analytics data for a plurality of online user interactions across a plurality of communication channels (e.g., online communication channels).

As further shown in FIG. 4, the method 400 includes an act 420 of analyzing the analytics data to identify attributes. For example, in one or more embodiments, the act 420 includes analyzing the analytics data to identify attributes of the plurality of online user interactions. In one or more embodiments, analyzing the analytics data to identifying attributes includes identifying predefined signals based on tracked user behavior with respect to the plurality of online user interactions. In one or more embodiments, the method 400 includes, for each of the plurality of online user interactions, identifying a type of online user interaction and identifying a set of attributes based on the identified type of online user interaction. Further, in one or more embodiments, the method 400 includes identifying different sets of attributes for different types of online user interactions of the plurality of online user interactions.

In one or more embodiments, the method 400 involves identifying a variety of different attributes. For example, in one or more embodiments, analyzing the analytics data to identify attributes includes, for each of the plurality of online user interactions, identifying two or more of a length of the online user interaction, a time between the online user interaction and a previous online user interaction for a user, and a time between the online user interaction and a subsequent online user interaction for the user. In one or more embodiments, analyzing the analytics data to identify attribute includes, for each of the plurality of online user interactions, identifying one or more of social customer relationship management text, live chat text, survey results, a length of an online user interaction, a time between the online user interaction and a previous online user interaction, a time between the online user interaction and a subsequent online user interaction, an identifier of a previous online user interaction, and an identifier of a subsequent online user interaction. In one or more embodiments, the method 400 includes identifying multiple of the above attributes (e.g., two or more attributes) for corresponding types of online user interactions.

As further shown in FIG. 4, the method 400 includes an act 430 of determining sentiment scores for each of the plurality of online user interactions based on the identified attributes. For example, in one or more embodiments, the act 430 involves determining sentiment scores for each of the plurality of online user interactions based on the identified attributes of the plurality of user interactions. In one or more embodiments, each of the sentiment scores indicate a measurement of sentiment of a user of the plurality of users associated with an online user interaction.

In one or more embodiments, determining sentiment scores for each of the plurality of online user interactions includes determining a sentiment score for an online user interaction based on a combination of multiple attributes. In addition, in one or more embodiments, determining the sentiment score for the online user interaction based on the combination of multiple attributes includes applying different weighting factors to the different attributes. In one or more embodiments, the method includes identifying a type of the online user interaction and applying different weighting factors to the multiple attributes based on the identified type of online user interaction.

As further shown in FIG. 4, the method 400 includes an act 440 of aggregating the plurality of online user interactions to identify an interaction path. For example, in one or more embodiments, the act 440 involves aggregating the plurality of online user interactions to identify an interaction path comprising a plurality of types of online user interactions experienced by a threshold number of the plurality of users associated with a target metric. For example, in one or more embodiments, the method 400 includes identifying an interaction path including online user interactions experienced by a majority (or other predefined percentage) of users. As another example, in one or more embodiments, the method 400 includes identifying an interaction path including any number of online user interactions experienced a minimum number of times by the plurality of users.

As further shown in FIG. 4, the method 400 includes an act 450 of generating an interactive presentation including a visualization of the interaction path including interaction icons and sentiment icons. For example, in one or more embodiments, the act 450 involves generating an interactive presentation comprising a visualization of the interaction path, the visualization of the interaction path comprising interaction icons associated with the plurality of types of online user interactions and sentiment icons associated with the determined sentiment scores for the plurality of online user interactions.

Similar to one or more embodiments described herein, the method 400 may include providing various interactive features in connection with providing the interactive presentation to a user. For example, in one or more embodiments, the method 400 includes receiving a user input identifying a number of types of online user interactions to include within the interaction path. In addition, in one or more embodiments, the method 400 further includes limiting a number of the interaction icons in the visualization of the interaction path based on the number of types of online user interactions identified by the user input.

In addition, in one or more embodiments, the method 400 includes facilitating display of a visualization of the interactive presentation via a client device 116. For example, in one or more embodiments, the method 400 includes providing the interactive presentation to a client device 116 where providing the interactive presentation to the client device 116 causes the client device to display the visualization of the interaction path. In one or more embodiments, the method 400 involves providing the interactive presentation to the client device 116 via a web browser or other application (e.g., presentation application 118) installed on the client device 116.

As described above, the interactive presentation can include various interactive features provided via a visualization of the interaction path. For example, in one or more embodiments, the interactive presentation includes a digital asset corresponding to a type of online user interaction within the interaction path. In addition, in one or more embodiments, the visualization of the interaction path includes an asset icon corresponding to the digital asset. In response to detecting a user selection of the asset icon, the method 400 may provide the digital asset (or preview of the digital asset) to the client device 116. In addition, in one or more embodiments, the visualization of the interaction path includes an indicator of a communication channel over which a corresponding type of online user interaction occurred for each of the interaction icons.

In one or more embodiments, the method 400 includes detecting a selection of an interaction icon within the visualization of the interaction path. In addition, in response to detecting the selection of the interaction icon, the method 400 includes providing a window within the visualization of the interaction path including an identification of one or more contributing factors associated with the sentiment scores for online user interactions corresponding to the selected interaction icon.

In one or more embodiments, the method 400 includes detecting a selection of a segment of users from the plurality of users 114*a-n* where the segment of users includes a subset of the plurality of users. In addition, in one or more embodiments, the method 400 includes modifying the visualization of the interaction path to reflect sentiment scores corresponding to the determined sentiment scores for the segment of users. Further, in one or more embodiments, the method 400 includes detecting one or more anomalies between the sentiment scores for the online user interactions associated with the segment of users and the sentiment scores for the plurality of online user interactions associated with the plurality of users. In addition, in one or more embodiments, the method 400 includes providing an indication of the one or more anomalies within the visualization of the interaction path.

In addition, in one or more embodiments, the method 400 for aggregating interaction information and generating a presentation including a visualization of an interaction path involves determining a range of sentiment scores for various types of online user interactions. For example, in one or more embodiments, the method 400 determines a range of sentiment scores by determining sentiment scores for each online user interaction and aggregating the sentiment scores for the plurality of user interactions to calculate ranges of sentiment scores for the plurality of types of online user interactions.

Figure 5:
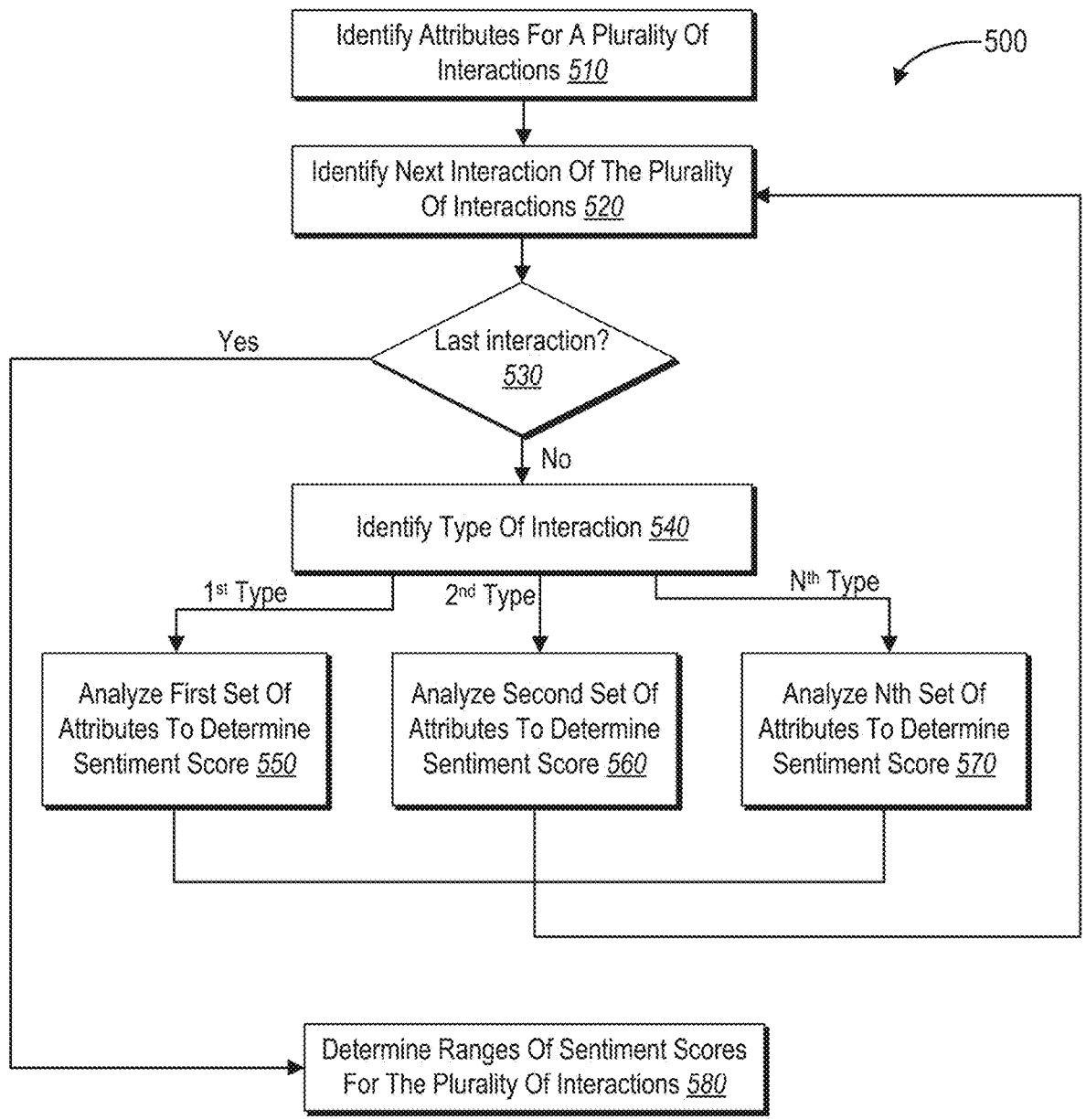
FIG. 5 illustrates a series of acts for determining sentiment scores for online user interactions in accordance with one or more embodiments.

FIG. 5 illustrates an example method 500 for determining sentiment scores for different online user interactions and further determining a range of sentiment scores for a plurality of types of online user interactions. In particular, as shown in FIG. 5, the method 500 includes acts 510-580, which can comprise the corresponding structure for a step for determining ranges of sentiment scores for types of online user interactions. In particular, in one or more embodiments, acts 510-580 comprise the corresponding structure for a step for determining, based on collected analytics data, ranges of sentiment scores for a plurality of types of online user interactions associated with a sentiment of a plurality of users for the plurality of types of online user interactions.

The method 500 starts by identifying 510 attributes for a plurality of interactions (e.g., online user interactions). For example, in one or more embodiments, the journey mapping system 108 identifies predefined signals based on analytics data collected for the plurality of interactions. In one or more embodiments, the journey mapping system 108 identifies attributes including predefined signals based on user behavioral data associated with detected user actions in connection with each of the plurality of interactions. As discussed above, the journey mapping system 108 can identify a variety of attributes including, for example, text associated with an interaction, survey results, detected user inputs, sequences of user inputs, duration of the interaction, duration between interactions, subsequent and/or previous interactions, etc. As discussed above, some of the attributes may apply generally to most or all types of interactions. Alternatively, some of the attributes may apply to individual types of interactions.

As shown in FIG. 5, the method 500 further includes identifying 520 a next interaction of the plurality of interactions. In addition, the method 500 includes determining 530 whether the next interaction is the last interaction of the plurality of interactions. If the next interaction is not the last interaction, the method 500 includes identifying 540 a type of the interaction. For example, in one or more embodiments, the journey mapping system 108 identifies a type of interaction based on a communication channel over which the interaction occurs. As an alternative, in one or more embodiments, the journey mapping system 108 identifies a type of interaction based on an interaction identifier corresponding to a defined interaction-type (e.g. a user login, delivery of a specific video advertisement, filling out an online survey, etc.)

The method 500 additionally involves analyzing the attributes based on the determined type(s) of interactions. For example, as shown in FIG. 5, where the next interaction is a first type of interaction, the method 500 includes analyzing 550 a first set of attributes to determine a sentiment score. As another example, where the next interaction is a second type of interaction, the method 500 includes analyzing 560 a second set of attributes to determine a sentiment score. The method 500 can include analyzing a number of combinations or sets of attributes based on a number of types of interactions. As such, when the next interaction is an Nth type of interaction, the method 500 includes analyzing 570 an Nth set of attributes to determine a sentiment score.

After analyzing a set of attributes based on the identified type of interaction, the method 500 proceeds to identify 520 the next interaction of the plurality of interactions and again determine 530 whether the next interaction is the last interaction of the plurality of interactions. Where the next interaction is not the last interaction, the method 500 includes iteratively determining sentiment scores based on different sets of attributes (based on the types of interactions). Alternatively, where the next interaction is the last interaction, the method 500 includes determining 580 ranges of sentiment scores for the plurality of interactions. For example, the journey mapping system 108 determines a range of sentiment scores for each type of interaction of the plurality of interactions Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred, or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In one or more embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural marketing features and/or methodological acts, it is to be understood that the subject matter defined in the appended claims is not necessarily limited to the described marketing features or acts described above. Rather, the described marketing features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), a web service, Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 6:
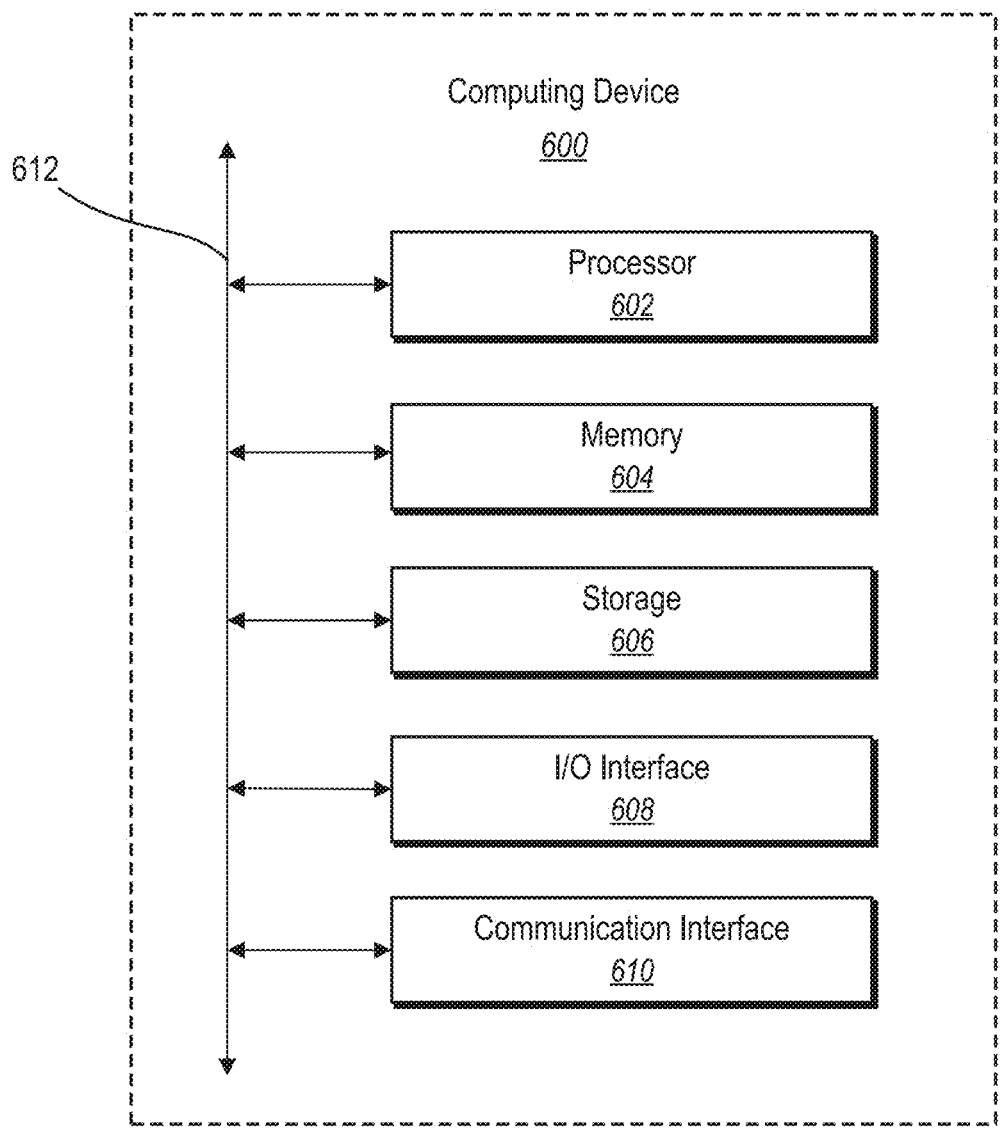
FIG. 6 illustrates a block diagram of an exemplary computing device in accordance with one or more embodiments.

FIG. 6 illustrates a block diagram of exemplary computing device 600 that may be configured to perform one or more of the processes described above. As shown by FIG. 6, the computing device 600 can comprise a processor 602, a memory 604, a storage device 606, an I/O interface 608, and a communication interface 610, which may be communicatively coupled by way of a communication infrastructure 612. In certain embodiments, the computing device 600 can include fewer or more components than those shown in FIG. 6. Components of the computing device 600 shown in FIG. 6 will now be described in additional detail.

In one or more embodiments, the processor 602 includes hardware for executing instructions, such as those making up a computer program. As an example, and not by way of limitation, to execute instructions for digitizing real-world objects, the processor 602 may retrieve (or fetch) the instructions from an internal register, an internal cache, the memory 604, or the storage device 606 and decode and execute them. The memory 604 may be a volatile or non-volatile memory used for storing data, metadata, and programs for execution by the processor(s). The storage device 606 includes storage, such as a hard disk, flash disk drive, or other digital storage device, for storing data or instructions related to object digitizing processes (e.g., digital scans, digital models).

The I/O interface 608 allows a user to provide input to, receive output from, and otherwise transfer data to and receive data from computing device 600. The I/O interface 608 may include a mouse, a keypad or a keyboard, a touch screen, a camera, an optical scanner, network interface, modem, other known I/O devices or a combination of such I/O interfaces. The I/O interface 608 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 608 is configured to provide graphical data to a display for presentation to a user. The graphical data may be representative of one or more graphical user interfaces and/or any other graphical content as may serve a particular implementation.

The communication interface 610 can include hardware, software, or both. In any event, the communication interface 610 can provide one or more interfaces for communication (such as, for example, packet-based communication) between the computing device 600 and one or more other computing devices or networks. As an example, and not by way of limitation, the communication interface 610 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 610 may facilitate communications with various types of wired or wireless networks. The communication interface 610 may also facilitate communications using various communication protocols. The communication infrastructure 612 may also include hardware, software, or both that couples components of the computing device 600 to each other. For example, the communication interface 610 may use one or more networks and/or protocols to enable a plurality of computing devices connected by a particular infrastructure to communicate with each other to perform one or more aspects of the digitizing processes described herein. To illustrate, the image compression process can allow a plurality of devices (e.g., server devices for performing image processing tasks of a large number of images) to exchange information using various communication networks and protocols for exchanging information about a selected workflow and image data for a plurality of images.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. In a digital medium environment for collecting and analyzing analytics data, a computer-implemented method for aggregating interaction information and presenting a user journey comprising:
    collecting, by a server device, analytics data for a plurality of online user interactions for a plurality of users with respect to an online entity;
    analyzing the analytics data to identify attributes of the plurality of online user interactions;
    determining sentiment scores for each of the plurality of online user interactions based on the identified attributes of the plurality of user interactions, each sentiment score indicating a measurement of sentiment of a user of the plurality of users associated with an online user interaction;
    aggregating the plurality of online user interactions to identify an interaction path comprising a plurality of different types of online user interactions experienced by a threshold number of the plurality of users associated with a target metric;
    aggregating the sentiment scores for each type of online user interaction of the plurality of different types of online user interactions to generate a general sentiment score indicating a measurement of sentiment of users who experienced a corresponding type of online user interaction;
    generating an interactive presentation comprising a visualization of the interaction path, the visualization of the interaction path comprising:
        a sequence of interaction icons representing the different types of online user interactions;
        sentiment icons indicating a range of the determined general sentiment scores for the respective different types of online user interactions in the interaction path, wherein the range of the determined general sentiment scores comprises a lowest sentiment score to a highest sentiment score; and
        segment icons corresponding to segments of users from the plurality of users, the segments of users comprising subsets of the plurality of users;
    generating a sentiment window corresponding to a sentiment icon of the sentiment icons, the sentiment window comprising a notification of an abnormal sentiment icon and description of factors contributing to the abnormality;
    providing the sentiment window within the interactive presentation; and
    in response to detecting a selection of a segment icon corresponding to a segment of users, modifying the visualization of the interaction path to reflect interactions experienced by the selected segment of users by modifying a size of the sentiment icons to indicate a range of segment sentiment scores for the segment of users for the respective different types of online user interactions in the interaction path.

2. The method of claim 1, further comprising excluding outliers from the range of determined general sentiment scores and the range of segment sentiment scores.

3. The method of claim 1, wherein analyzing the analytics data to identify attributes of the plurality of online user interactions comprises identifying predefined signals based on tracked user behavior with respect to the plurality of online user interactions.

4. The method of claim 1, further comprising, in response to detecting a selection of a segment icon corresponding to a segment of users, further modifying the visualization of the interaction path to reflect interactions experienced by the selected segment of users by:
  identifying a segment interaction path reflecting interactions commonly experienced by the selected segment; and
  replacing, within the visualization of the interaction path, the sentiment icons with segment sentiment icons corresponding to the segment interaction path.

5. The method of claim 4, further comprising identifying different sets of attributes for different types of online user interactions of the plurality of online user interactions.

6. The method of claim 1, wherein analyzing the analytics data to identify attributes comprises, for each of the plurality of online user interactions, identifying two or more of: a length of the online user interaction, a time between the online user interaction and a previous online user interaction for a user, or a time between the online user interaction and a subsequent online user interaction for the user.

7. The method of claim 1, wherein analyzing the analytics data to identify attributes comprises, for each of the plurality of online user interactions, identifying one or more of: social customer relationship management text, live chat text, survey results, a length of an online user interaction, a time between the online user interaction and a previous online user interaction, a time between the online user interaction and a subsequent online user interaction, an identifier of a previous online user interaction, or an identifier of a subsequent online user interaction.

8. The method of claim 1, further comprising:
  receiving a user input identifying a number of types of online user interactions to include within the interaction path; and
  limiting a number of the interaction icons in the visualization of the interaction path based on the number of types of online user interactions identified by the user input.

9. The method of claim 1, wherein the interactive presentation further comprises a digital asset corresponding to a type of online user interaction within the interaction path.

10. The method of claim 9, wherein the visualization of the interaction path comprises an asset icon corresponding to the digital asset, and wherein the method further comprises, in response to detecting a user selection of the asset icon on a client device, providing the digital asset to the client device.

11. The method of claim 1, wherein the visualization of the interaction path further comprises an indicator of a communication channel over which the corresponding type of online user interaction occurred for each of the interaction icons.

12. In a digital medium environment for collecting and analyzing analytics data, a computer-implemented method for aggregating interaction information and presenting a user journey comprising:
  collecting, by a server device, analytics data for a plurality of online user interactions for a plurality of users with respect to an online entity;
  analyzing the analytics data to identify attributes of the plurality of online user interactions;
  determining sentiment scores for each of the plurality of online user interactions based on the identified attributes of the plurality of user interactions, each sentiment score indicating a measurement of sentiment of a user of the plurality of users associated with an online user interaction;
  aggregating the plurality of online user interactions to identify an interaction path comprising a plurality of different types of online user interactions experienced by a threshold number of the plurality of users associated with a target metric;
  generating an interactive presentation comprising a visualization of the interaction path, the visualization of the interaction path comprising:
    a sequence of interaction icons representing the types of online user interactions; and
    sentiment icons indicating a range of determined general sentiment scores for the types of online user interactions, wherein the range of the determined general sentiment scores comprises a lowest sentiment score to a highest sentiment score; and
    segment icons corresponding to segments of users from the plurality of users, the segments of users comprising subsets of the plurality of users;
  generate a sentiment window corresponding to a sentiment icon of the sentiment icons, the sentiment window comprising a notification of an abnormal sentiment icon and description of factors contributing to the abnormality;
  provide the sentiment window within the interactive presentation; and
  in response to detecting a selection of a segment icon corresponding to a segment of users, modifying the visualization of the interaction path to reflect interactions experienced by the selected segment of users by modifying a size of the sentiment icons to indicate a range of segment sentiment scores for the segment of users for the respective different types of online user interactions in the interaction path.

13. The method of claim 12, wherein determining the ranges of sentiment scores comprises:
  determining a sentiment score for each online user interaction, wherein determining the sentiment score comprises, for each online user interaction:
  identifying a type of online user interaction;
  analyzing the analytics data to identify a set of attributes for an online user interaction based on the identified type of online user interaction;
  determining a sentiment score for the online user interaction based on the identified set of attributes; and
  aggregating the sentiment scores for the plurality of user interactions to calculate ranges of sentiment scores for the plurality of types of online user interactions.

14. The method of claim 13, wherein determining the sentiment score for each online user interaction comprises, for each online user interaction, analyzing the analytics data to identify two or more attributes comprising one or more of: a length of the online user interaction, a time between the online user interaction and a previous online user interaction for a user, a time between the online user interaction and a subsequent online user interaction for the user, social customer relationship management text, live chat text, survey results, an identifier of a previous online user interaction, or an identifier of a subsequent online user interaction.

15. The method of claim 12, wherein determining the ranges of sentiment scores comprises determining a sentiment score for each of the plurality of online user interactions based on a combination of multiple attributes.

16. The method of claim 15, wherein determining the sentiment score for each of the online user interaction based on the combination of multiple attributes comprises, for each of the online user interactions:

identifying a type of the online user interaction; and applying different weighting factors to the multiple attributes based on the identified type of the online user interaction.

17. A system for generating and presenting a customer journey, the system comprising:

at least one processor; and a non-transitory storage medium comprising instructions thereon that, when executed by the at least one processor, cause the system to:

collect analytics data for a plurality of online user interactions for a plurality of users with respect to an online entity;

identify, for each of the plurality of online user interactions, a type of online user interaction;

identify, for each of the plurality of online user interactions and based on the analytics data, a set of attributes corresponding to the identified type of online user interaction;

determine, for each of the plurality of online user interactions, a sentiment score based on the identified attributes of the plurality of online user interactions indicating a measurement of sentiment of a user of the plurality of users associated with the online user interaction;

aggregate the plurality of online user interactions to identify an interaction path comprising a plurality of different types of online user interactions associated with a target metric;

aggregate the sentiment scores for each type of online user interaction of the plurality of different types of online user interactions to generate a general sentiment score indicating a measurement of sentiment of users who experienced a corresponding type of online user interaction;

generate an interactive presentation comprising a visualization of the interaction path, the visualization of the interaction path comprising:

a sequence of interaction icons representing the different types of online user interactions;

sentiment icons indicating a range of the determined general sentiment scores for the respective types of online user interactions in the interaction path, wherein the range of the determined general sentiment scores comprises a lowest sentiment score to a highest sentiment score; and segment icons corresponding to segments of users from the plurality of users, the segments of users comprising subsets of the plurality of users;

generate a sentiment window corresponding to a sentiment icon of the sentiment icons, the sentiment window comprising a notification of an abnormal sentiment icon and description of factors contributing to the abnormality;

provide the sentiment window within the interactive presentation; and in response to detecting a selection of a segment icon corresponding to a segment of users, modifying the visualization of the interaction path to reflect interactions experienced by the selected segment of users by modifying a size of the sentiment icons to indicate a range of segment sentiment scores for the segment of users for the respective different types of online user interactions in the interaction path.

18. The system of claim 17, wherein the instructions further cause the system to:

detect a selection of an interaction icon within the visualization of the interaction path; and in response to detecting the selection of the interaction icon, provide a window within the visualization of the interaction path comprising an identification of one or more factors associated with a measurement of sentiment for the plurality of users with respect to the online user interactions corresponding to the selected interaction icon.

19. The system of claim 17, wherein the instructions further cause the system to:

determine that the modified visualization differs from the visualization of the interaction path by a difference of at least a predetermined threshold from an average;

detect, based on the difference of at least the predetermined threshold, one or more anomalies between the modified visualization of the interaction path and the visualization of the interaction path; and provide an indication of the one or more anomalies within the modified visualization of the interaction path.

20. The method of claim 10, further comprising, in response to detecting the user selection of the asset icon, providing a preview of the digital asset to the client device within the interactive presentation.

* * * * *